Dec. 5, 1944.　　　　E. A. FORD　　　　2,364,202
RECORD CONTROLLED MACHINE
Filed Feb. 27, 1936　　12 Sheets-Sheet 1
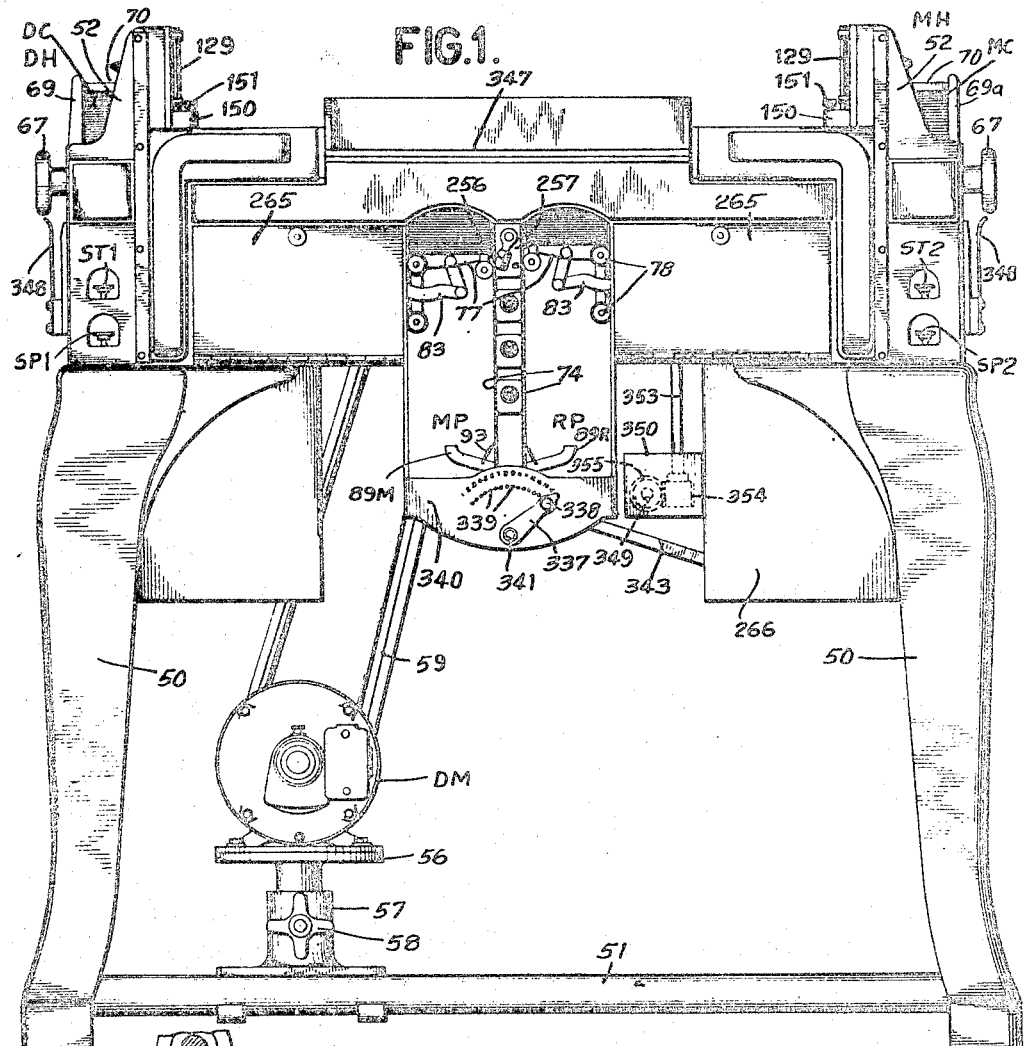
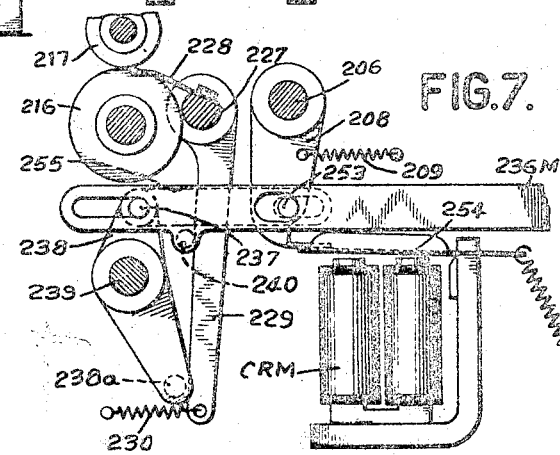
INVENTOR.
Eugene A. Ford
BY
ATTORNEY Dec. 5, 1944.  E. A. FORD  2,364,202
RECORD CONTROLLED MACHINE
Filed Feb. 27, 1936   12 Sheets-Sheet 2
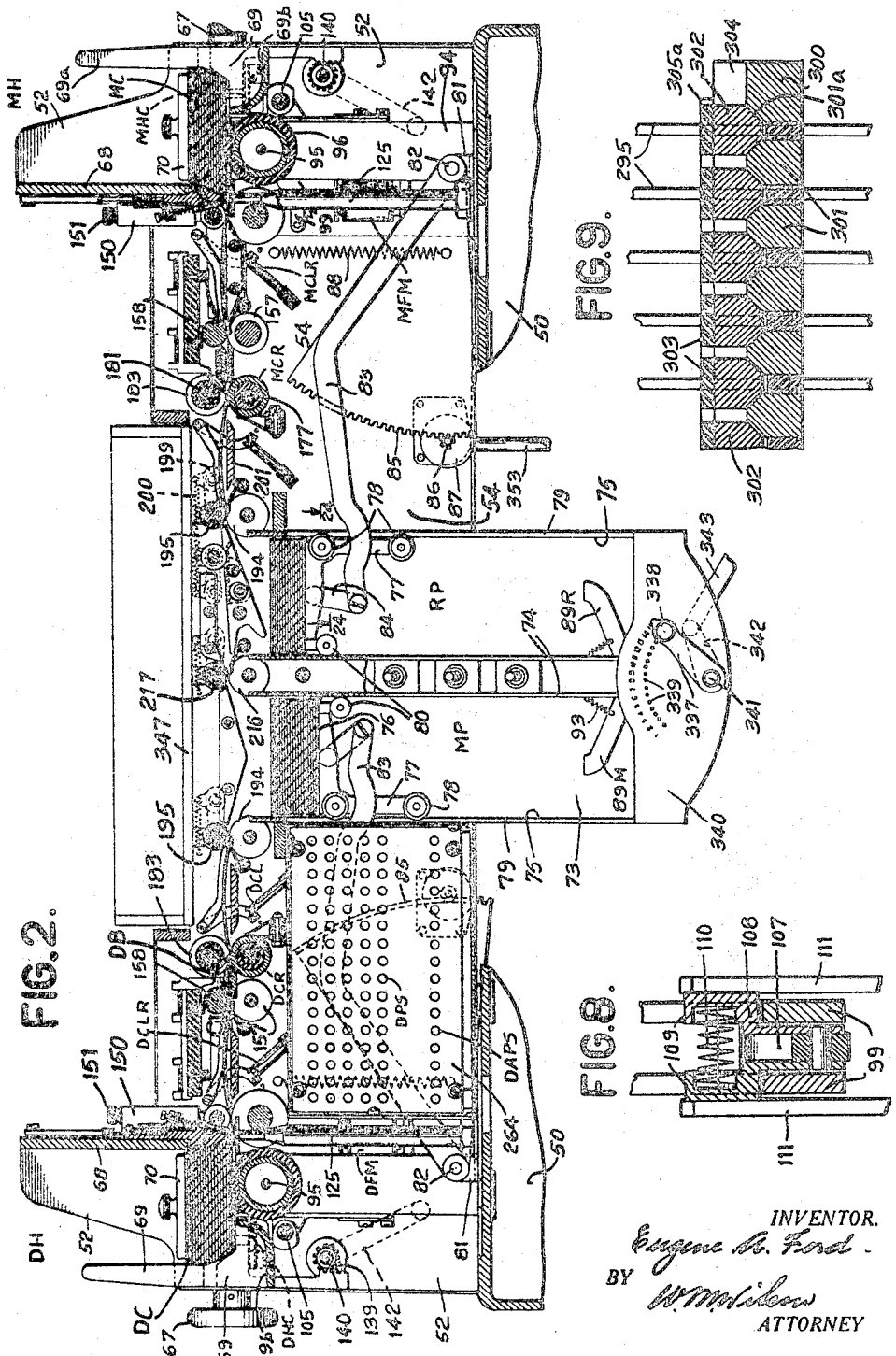
INVENTOR.
Eugene A. Ford
BY
W. M. Wilson
ATTORNEY INVENTOR.
Eugene A. Ford
BY
ATTORNEY Dec. 5, 1944.	E. A. FORD	2,364,202
RECORD CONTROLLED MACHINE
Filed Feb. 27, 1936	12 Sheets-Sheet 4
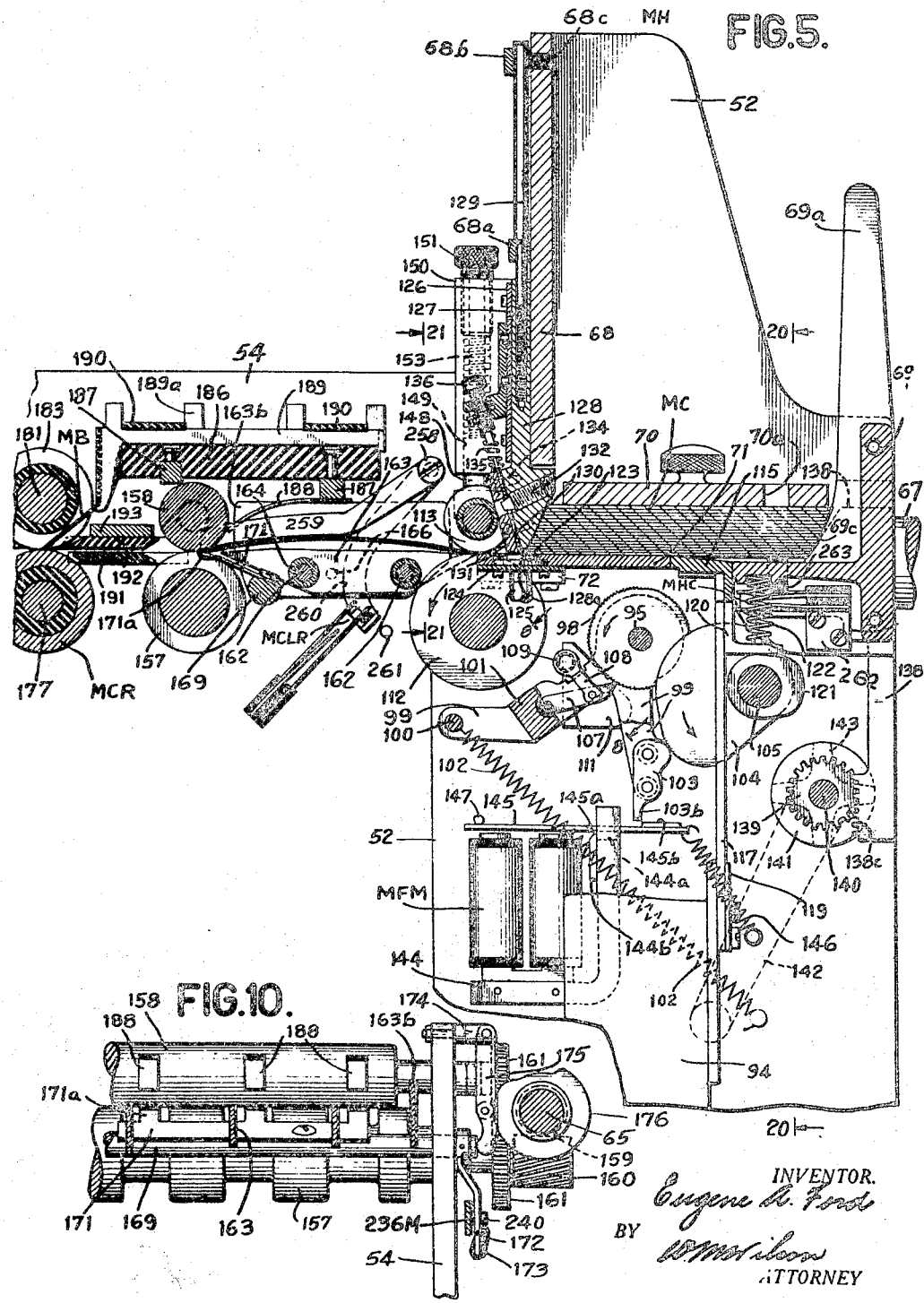
INVENTOR.
Eugene A. Ford
BY
W. M. Wilson
ATTORNEY

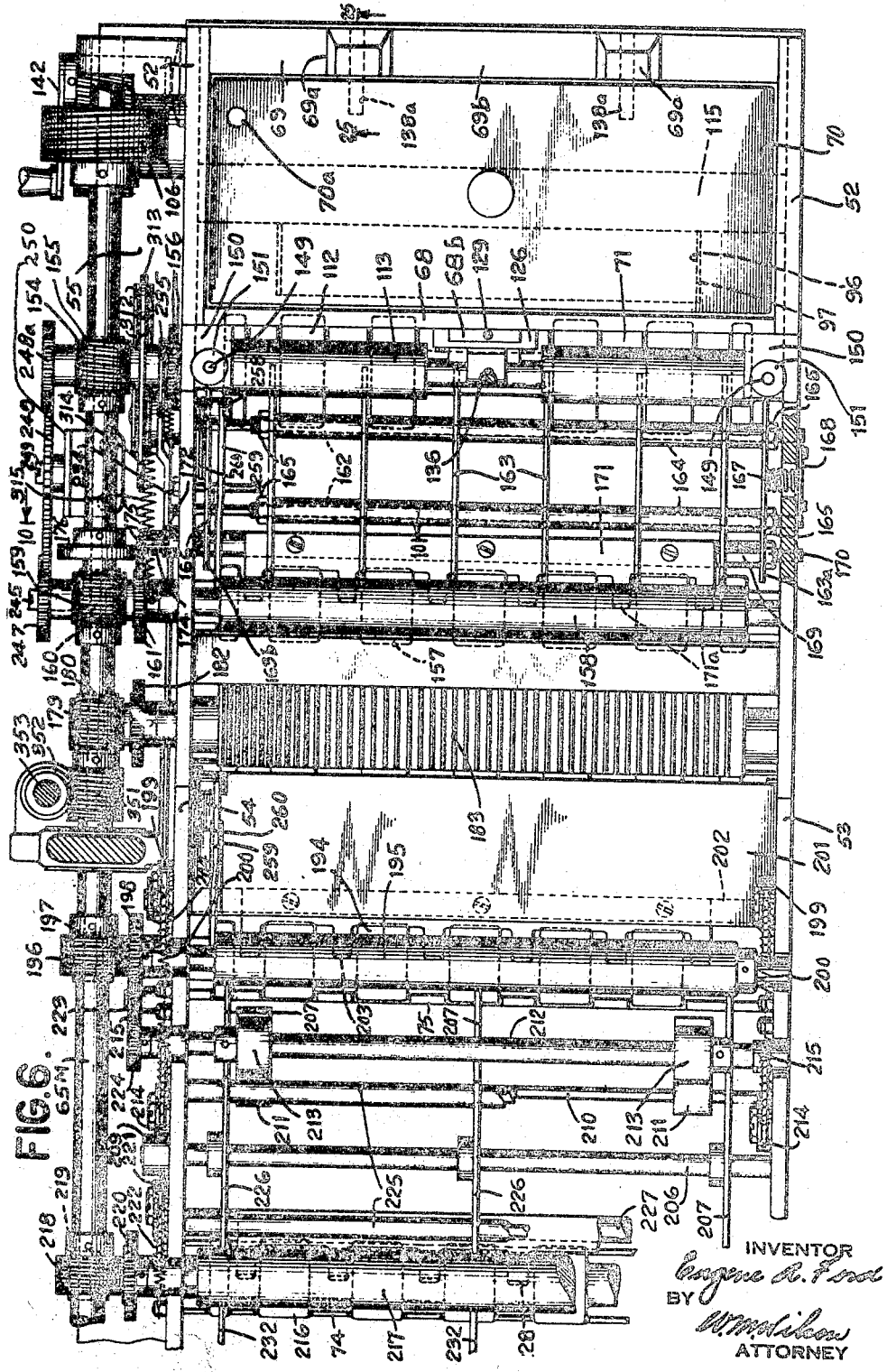

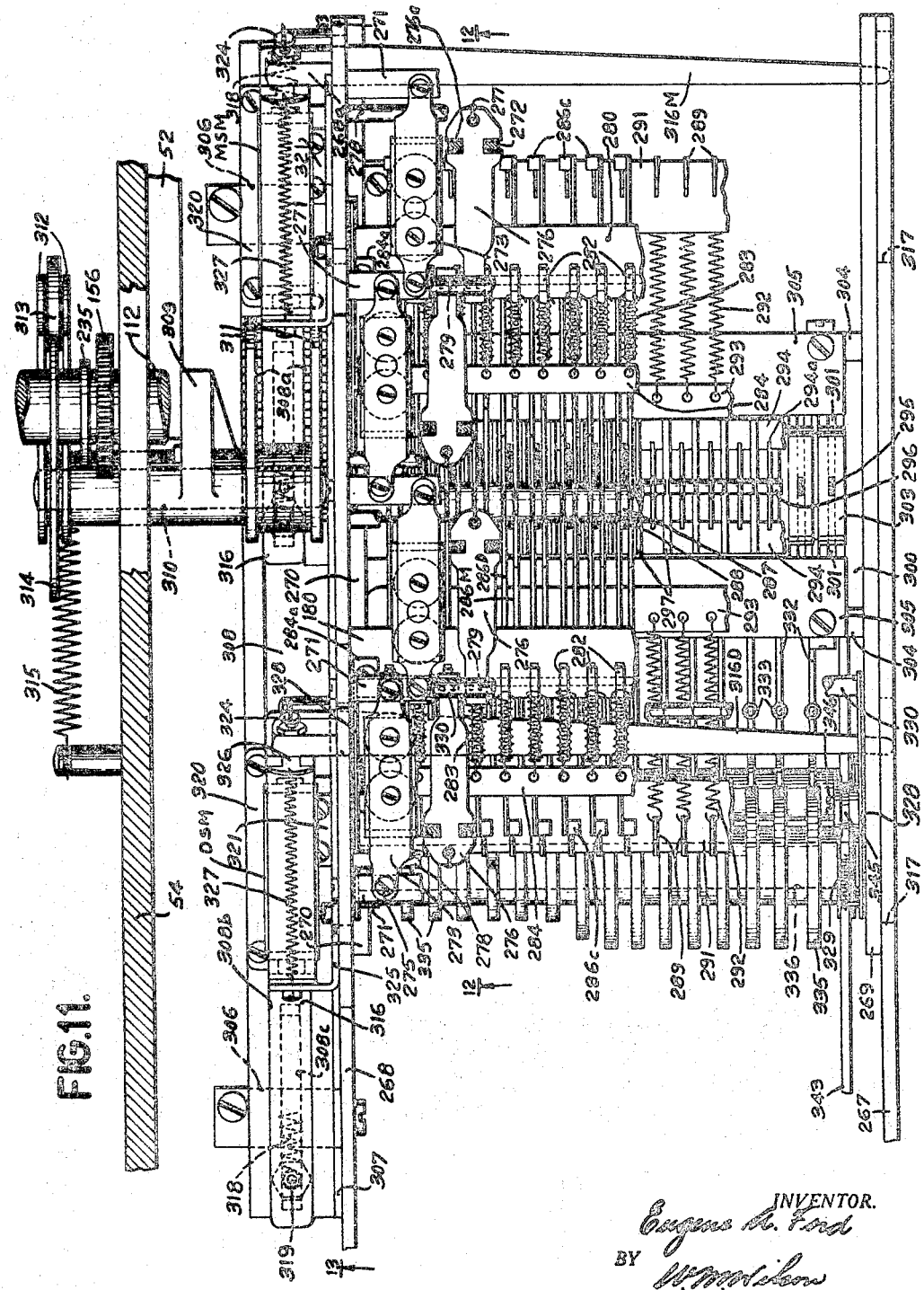

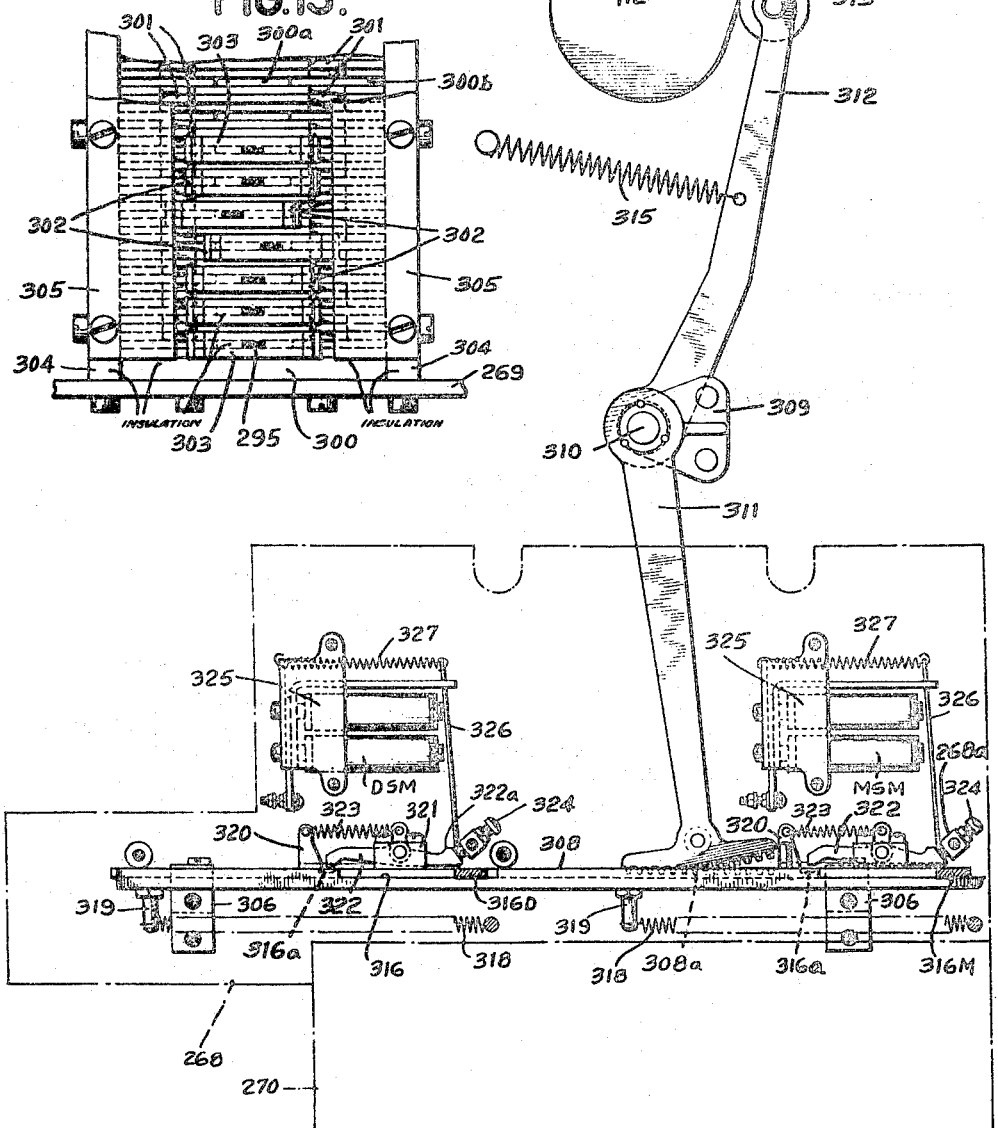

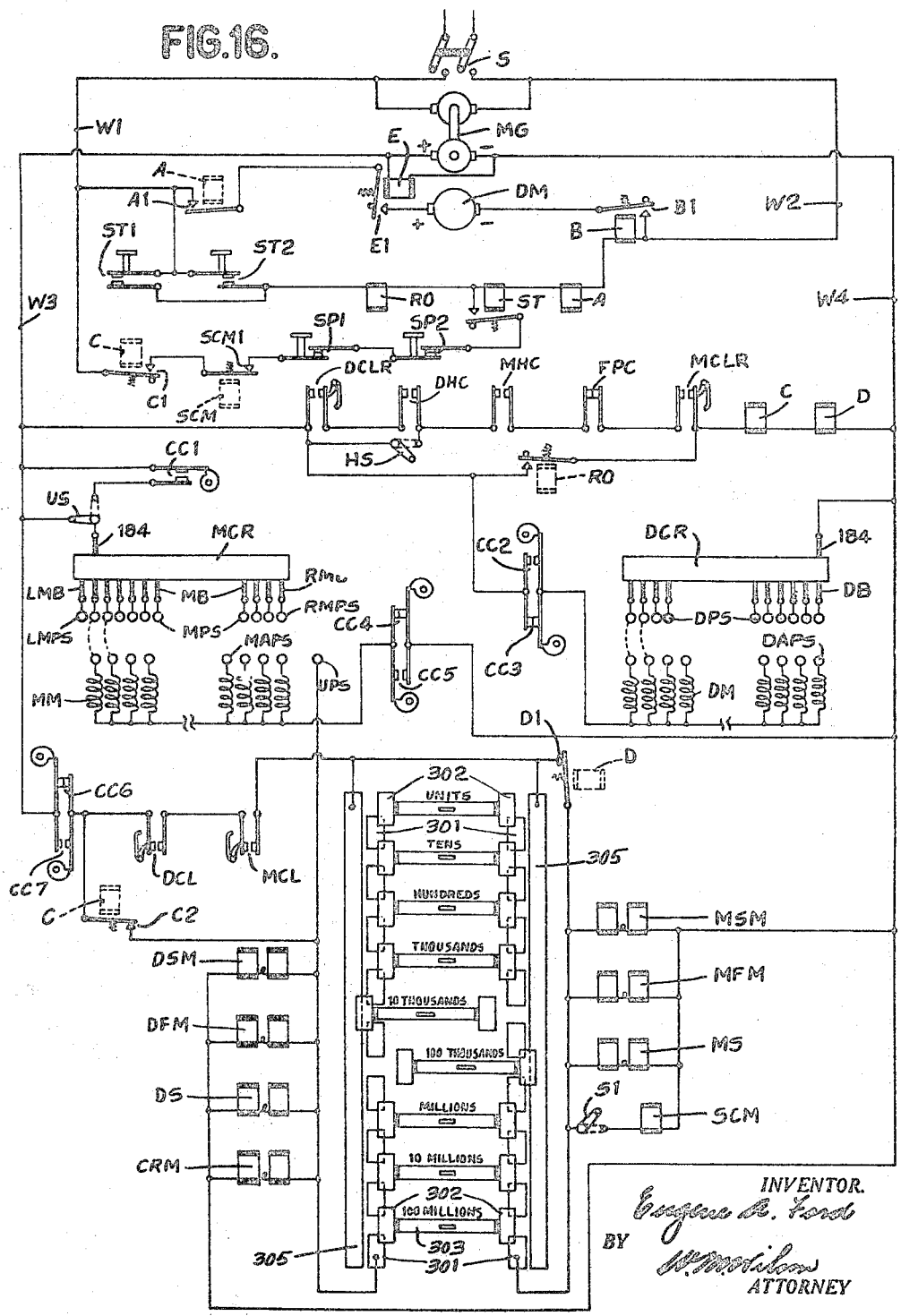

Dec. 5, 1944.    E. A. FORD    2,364,202
RECORD CONTROLLED MACHINE
Filed Feb. 27, 1936    12 Sheets-Sheet 10
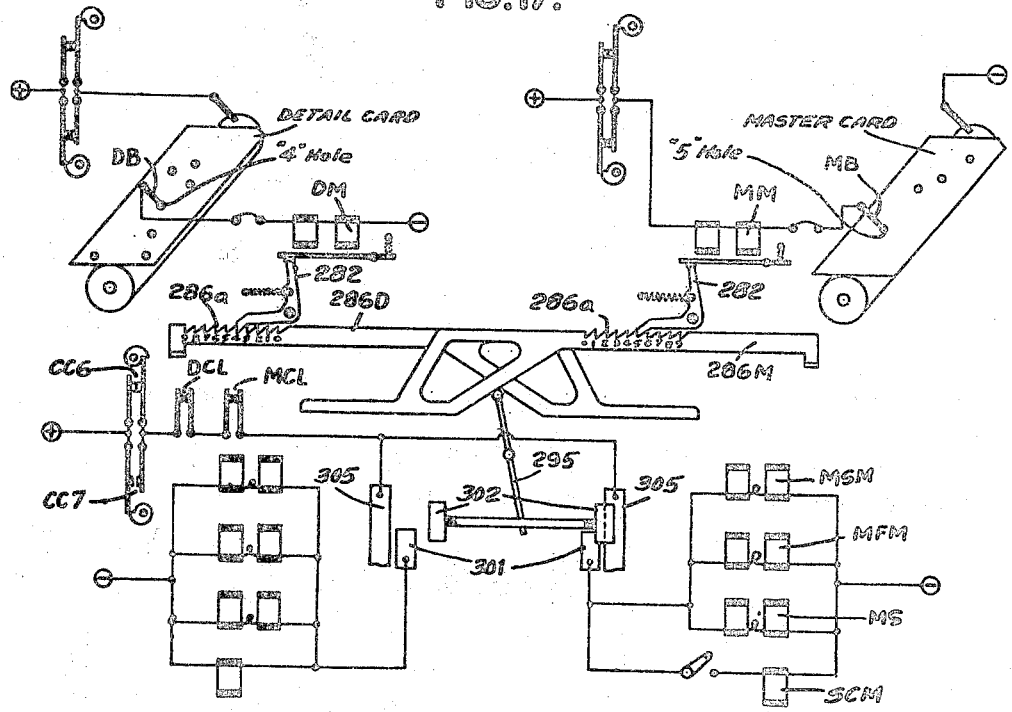
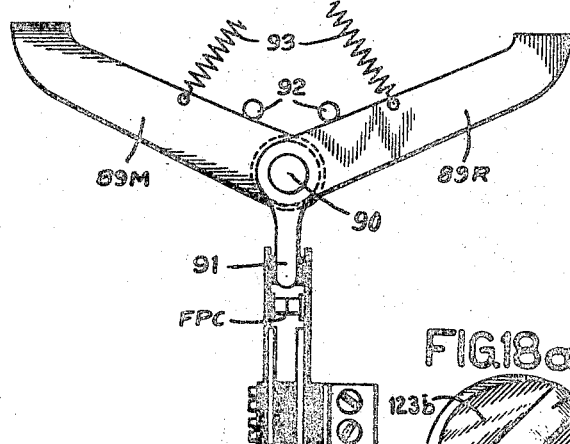
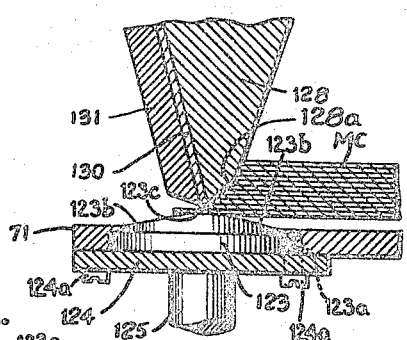
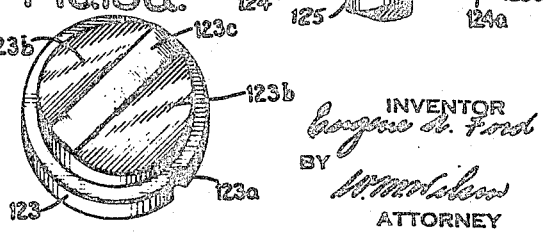

Dec. 5, 1944.  E. A. FORD  2,364,202
RECORD CONTROLLED MACHINE
Filed Feb. 27, 1936  12 Sheets-Sheet 11
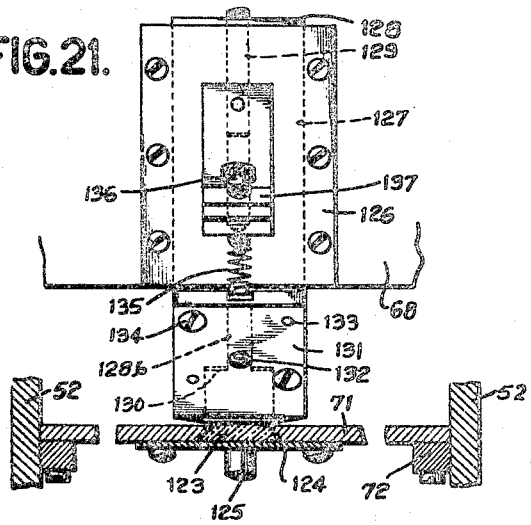
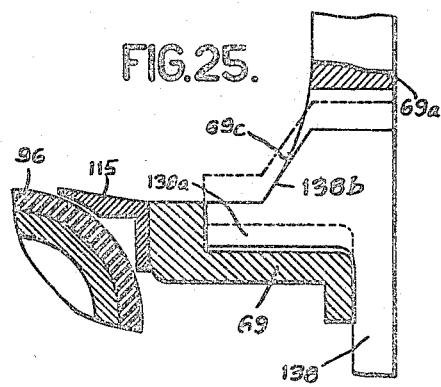
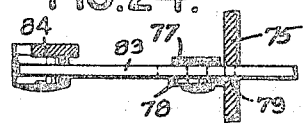
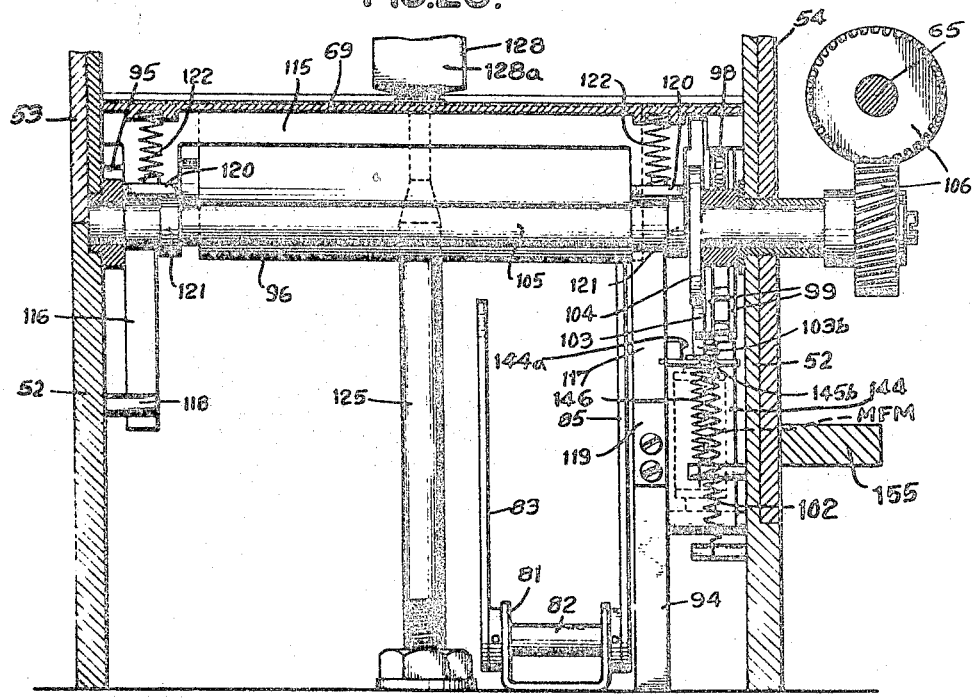
INVENTOR
Eugene A. Ford
BY
ATTORNEY Dec. 5, 1944.  E. A. FORD  2,364,202
RECORD CONTROLLED MACHINE
Filed Feb. 27, 1936   12 Sheets-Sheet 12
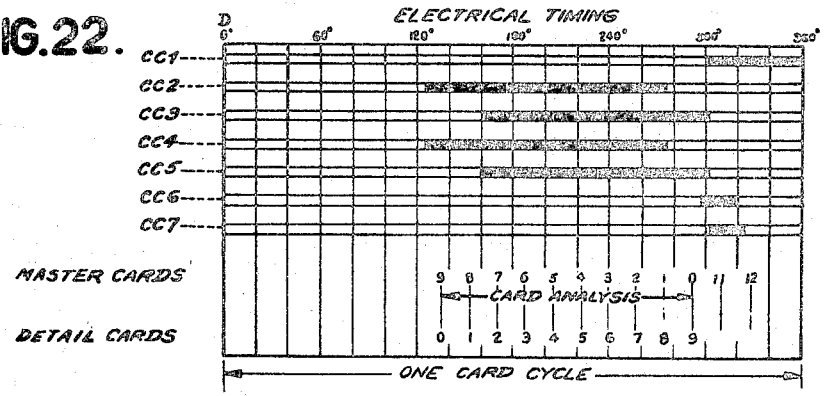
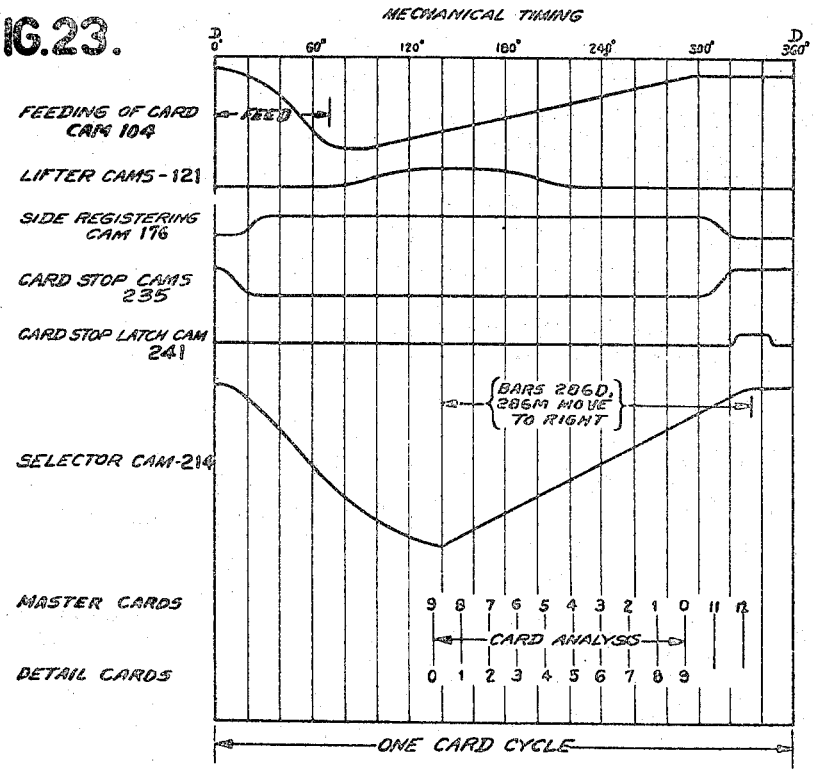
INVENTOR
Eugene A. Ford
BY
ATTORNEY 2,364,202

UNITED STATES PATENT OFFICE 2,364,202

RECORD CONTROLLED MACHINE

Eugene A. Ford, Scarsdale, N. Y., assignor to International Business Machines Corporation, New York, N. Y., a corporation of New York Application February 27, 1936, Serial No. 66,033

42 Claims. (Cl. 209—110)

This invention relates to record controlled machines in general.

The object of the present invention is to provide a record controlled machine which is capable of performing certain kinds of collating operations automatically. The term "collating" is herein used in the same general sense as in the continuous billing machine art where the term refers to the bringing together of related documents or forms for the purpose of performing some operation. Thus, the assembling of forms with or without carbon sheets between, in preparation for an entry, as by an adding machine or typewriter, is termed "collating." The machine described herein is designed to operate upon and under control of perforated record cards, like those used in the well known Powers and Hollerith accounting and statistical machines.

A number of the collating operations of which the machine is capable will be described in detail hereinafter by way of example. As a matter of convenience in description, one side of the machine will be called the master card side while the other will be termed the detail card side, and the record cards will be termed master and detail cards, respectively. The parts of the machine will also be designated to correspond wherever convenient. It is to be understood, however, that this means of designating the cards, sides of the machine, card hoppers, feed mechanisms, and other parts of the machine, is purely a convenience as in practice the machine will be used in ways which may require that the detail cards be placed in the master card hopper and the master cards in the detail card hopper.

An object is to provide a novel record analyzing mechanism for comparing data designations in the records and controlling the machine in various ways according to the relation between the designations.

A further object is to provide a novel record feeding mechanism suitable for use in feeding thin sheets instead of the relatively thick cards now extensively used.

Another object is to provide an improved card throat.

An object is to provide a novel record registering mechanism for aligning the records relative to the sensing means prior to sensing the data recorded thereon.

Another object is to provide a novel device for correcting warping or buckling of the records to enable proper feeding of warped or buckled records.

Various other objects, advantages, and features of the invention will be specifically pointed out in the following description and claims or will be apparent after a study of the description, claims, and drawings.

In the drawings:

Fig. 1 is a front elevation of the machine.

Fig. 2 is a vertical longitudinal section.

Fig. 5 is an enlarged vertical longitudinal section showing the master card feeding mechanism.

Fig. 6 is a plan view of the mechanism shown in section in Figs. 4 and 5.

Fig. 7 is a detail view of one of the master card gates and its control mechanism.

Fig. 8 is a section on the line 8—8 in Fig. 5.

Fig. 9 is a diagonal vertical section on line 9—9 in Fig. 12.

Fig. 10 is a vertical section on line 10—10 in Fig. 6.

Fig. 11 is a dissected view of the analyzer unit as viewed from above.

Fig. 13 is a vertical section on line 13—13 in Fig. 11.

Fig. 15 is a horizontal section on the line 15—15 in Fig. 12.

Fig. 16 is a wiring diagram of the machine.

Fig. 17 is a simplified wiring diagram to illustrate the operating principle of the analyzing mechanism.

Fig. 18 is an enlarged vertical section of the hopper throat.

Fig. 18a is a perspective view of the throat button.

Fig. 19 is an enlarged view of the hopper stop contact mechanism.

Fig. 20 is a vertical section on line 20—20 in Fig. 5.

Fig. 21 is a vertical section on line 21—21 in Fig. 5.

Fig. 22 is an electrical time chart.

Fig. 23 is a mechanical time chart.

Fig. 24 is a horizontal section on line 24—24 in Fig. 2.

Fig. 25 is a vertical section on line 25—25 in Fig. 6.

I. Framework

Figure 3:
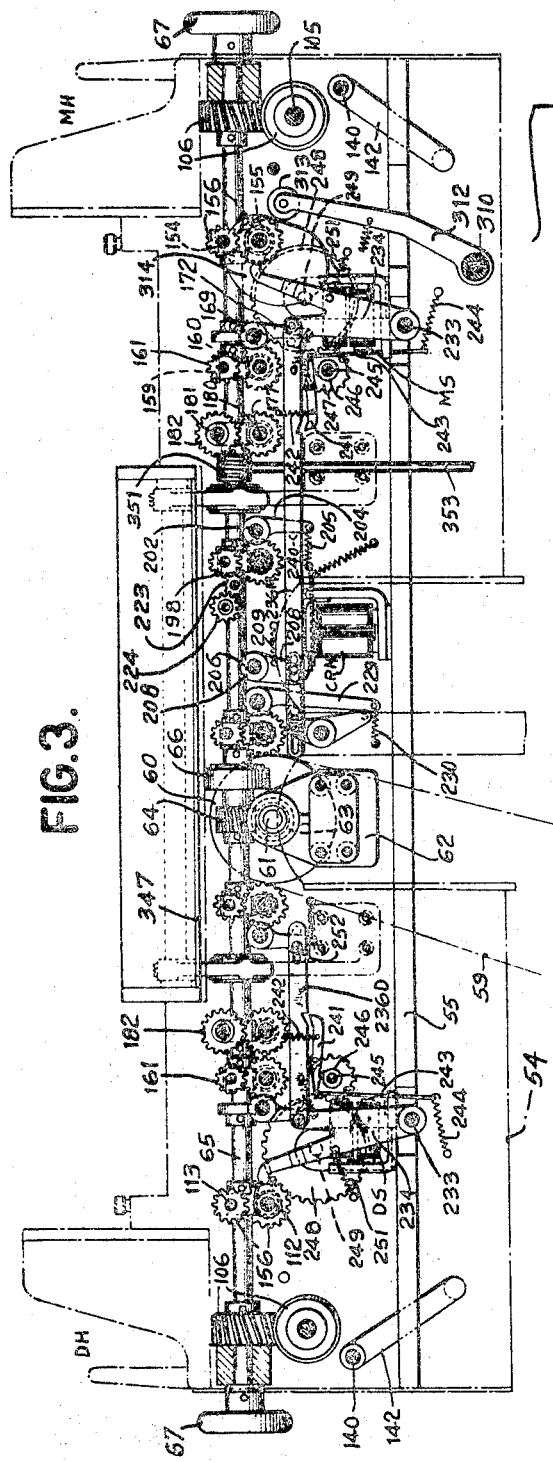
Fig. 3 is a vertical longitudinal section showing the driving mechanism.

The framework comprises a pair of leg castings 50 (Fig. 1), each having two legs; a pair of cross rods or tubes 51 rigidly joining the leg castings at their lower ends; two pairs of sub-frames 52 (Figs. 1, 5, 6, and 20), each secured at their lower ends to one of the leg castings, which sub-frames support the card supply hoppers and mechanism associated therewith; two long thin plates 53, 54 (Figs. 2, 3, 5, 6 and 20) secured in spaced relation to frames 52 on both sides of the machine so as to extend the length of the machine and supporting the card feeding mechanism, analyzing brushes, drive shafts, and control magnets; and a stiffening bar 55 (Figs. 3, 6, and 20) secured along the back of plate 54 for the purpose of strengthening plate 54 and making the main framework more rigid.

II. Drive Mechanism

The machine is driven by a motor DM (Fig. 1) which is mounted on a plate 56 vertically slidable in a socket 57 secured to cross bars 51. A hand wheel 58 on a clamping screw is provided for adjusting plate 56 vertically in socket 57 for the purpose of regulating the tension of the driving belt 59.

The latter runs over a pulley (not shown) secured to the motor shaft and a pulley 60 (Fig. 3) secured to a short shaft 61 journaled in a bracket 62 secured to the back of plate 54 near the middle of the machine. A helical pinion 63 secured to shaft 62 meshes with a similar pinion 64 loosely mounted on the main drive shaft 65 journaled in suitable bearings carried by the framework. Pinion 64 is connected to shaft 65 by means of an over running clutch 66 which permits turning shaft 65 forwardly by hand without turning the motor DM and drive pulleys. The ends of drive shaft 65 extend outside the machine and are provided with hand wheels 67 by means of which said shaft may be turned by hand forwardly.

III. Card Hoppers and Pockets

Besides the supply hoppers DH and MH, a reject pocket RP and a matching pocket MP (see Figs. 1 to 6) are provided. The detail cards DC are placed in hopper DH and conveyed to the matching pocket by feed mechanism to be described in the next section. The master cards MC, some of which are to be matched with the detail cards, are placed in hopper MH and conveyed either to matching pocket MP or to reject pocket RP according to whether the master cards match detail cards or do not match. The hoppers DH and MH, the feed mechanism, and most of the other mechanism associated with these hoppers are identical in construction.

Each hopper comprises a pair of end walls formed by upwardly projecting and tapering parts of the frame castings 52 (Fig. 5), a side wall 68, consisting of a plate secured to the edges of castings 52, and a pair of posts 69a formed in a casting 69 which is secured to frames 52. These posts guide the cards vertically and at the same time permit easy removal of the cards. As is usual in hoppers of this kind, an open pocket or hand space 69b (Fig. 2) is formed in each casting 69 between posts 69a to facilitate insertion and removal of cards from the hoppers. A follower plate or weight 70 is provided for each hopper to keep the cards as flat as possible.

The bottom of each hopper is partly formed by the casting 69 and a plate 71 mounted on blocks 72 secured to frames 52.

The pockets RP and MP (Fig. 2) are composed of rear plates 73 side plates 74, 75; and a bottom plate 76 which is movable vertically. Secured to the center of each bottom plate 76 along its shorter axis is an L-shaped member 77 on which are mounted two vertically aligned rollers 78 each of which has a flange riding in a vertical slot 79 cut in plate 75 (Fig. 24), the shoulder adjacent the flange bearing on the plate 75 adjacent the slot.

The two corners of each of the plates 76 adjacent plates 74 are provided with rollers 80 which roll over said plate along its front and rear edges.

A bracket 81 (Figs. 2 and 20) is mounted on leg casting 50 beneath each hopper DH, MH and supports a short shaft 82 to which is secured a long arm 83 extending toward the center of the machine and through slot 79 into the interior of the appropriate one of pockets MP and RP. As shown in Figs. 2 and 24, a short link 84 pivotally connects each arm 93 with the member 77 of the associated pocket. Secured to the other end of each shaft 82 is a gear sector 85 which meshes with the pinion 86 of a conventional form of governor 87 such as are often used as carriage brakes in typewriting machines.

Each of the sectors 85 is provided with a spring 88 which is connected to a pin on the sector and to a pin on the framework. Springs 88 tend to lift the sectors 85 and arms 83 and thereby lift the plates 76 which form the bottoms of the pockets RP, MP. As the cards accumulate in the pockets, their weight stretches springs 88 causing the plates 76 to move downwardly.

At the bottom of each pocket MP, RP is a lever 89R, 89M (Figs. 1, 2, and 19) each lever having an arm disposed in the path of one of the plates 76 in their downward movement. Both levers 89R, 89M are pivoted on a common stud 90 (see Fig. 19) and are held against stop pins 92 by springs 93. Each lever 89 has a downwardly projecting arm 91 which lies between and contacts with insulating buttons on the free ends of a pair of spring contact members FPC hereinafter called the full pocket contacts. Normally, the points on these contact members touch to maintain a circuit. If pocket RP becomes full, its plate 76 will strike lever 89R, rocking it clockwise a slight amount. This movement is sufficient for its arm 91 to move the left hand contact member FPC to the left far enough to separate the contact points thereby breaking the circuit maintained by contacts FPC. Similar action takes place when pocket MP becomes full. The governors 87 prevent the plates 76 from moving upwardly too fast when the cards in the pockets are removed.

IV. Friction Card Feed Mechanism

The cards in hoppers MH and DH are removed from the hoppers one at a time by a novel friction feed mechanism. This mechanism is shown in detail in Figs. 2, 5, 8, and 20, which illustrate the feed mechanism for the master card hopper MH. Mounted in the front frame 52 and in a vertical bar 94 is a horizontal shaft 95 on which is secured a friction feed roller 96. The latter, as shown in Fig. 2, consists of a drum surfaced with rubber or other suitable friction material and may be constructed in any well known way. This roller 96 projects slightly above the plate 71 forming part of the bottom of the master card hopper MH so that the cards in the hopper rest on the feed roller 96. The plate 71 has a rectangular open slot 97 cut therein, as shown in dotted lines in Fig. 6, to accommodate feed roller 96.

Secured to the rear end of shaft 95, behind the bar 94, is a ratchet wheel 98 (Figs. 5 and 20) having fine teeth. Loosely mounted on shaft 95, one in each side of ratchet wheel 98 is a pair of bell cranks 99. One arm of each bell crank extends toward the rockets MP R. These arms are secured together in spaced relation by a shouldered pin 100 and a spacing block 101. A spring 102, attached to pin 100 and to a pin fixed on the frame 52, normally tends to rock the pair of bell cranks counterclockwise as a unit.

The other arms of bell cranks 99 project downwardly and to the front side of the foremost bell crank 99 in Fig. 5 is secured a cam block 103, the rivets or screws which fasten the block to the bell cranks 99 also securing the latter together with spacing washers or sleeves between (Fig. 20). Cam block 103 bears on a cam 104 secured to a shaft 105 which is journaled in frames 52 and is driven by shaft 65 through gears 106 (Fig. 20). Shaft 105 turns in a clockwise direction in Fig. 5.

Pivotally mounted between bell cranks 99 on a pin in a recess formed in block 101 is a feed pawl 107 (Fig. 5) adapted to engage the teeth of ratchet 98. Pivoted to feed pawl 107 is a pair of drag links 108 (see Fig. 8 also) each of which has an offset portion formed as a cup-shaped head 109 in which is socketed a compression spring 110. The offset portions of links 108 fit loosely in notches cut in bell cranks 99 so that the links are free to move a limited amount transversely of the planes of bell cranks 99 but are capable of but little movement radially of shaft 95. A pair of triangular plates 111 are secured, respectively, to the rear face of bar 94 and to the front face of the rear frame 52 adjacent the heads 109. These plates extend along the line of movement of the heads 109 when the bell cranks 99 are rocked counterclockwise from the position of Fig. 5. Spring 110 (Fig. 8) presses the heads 109 firmly into contact with plates 111 so as to cause the heads 109 to ride over said plates and act like brake shoes.

As the cam 104 rotates, the bell cranks 99 will be permitted to rock counterclockwise (Fig. 5) under the tension of spring 102. The friction between the heads 109 of drag links 108 and plates 111, during this movement, will hold feed pawl 107 firmly in engagement with ratchet 98 causing the latter to rotate in the direction of the arrow shown on said ratchet in Fig. 5. As a result, the feed roller 96 will be similarly rotated and will frictionally feed the lowermost card in hopper MH to the left far enough to bring the left hand edge of the card between a pair of feed rolls 112, 113. The latter then carry the card to the left completely out of the hopper MH.

When the cam 104 positively restores bell cranks 99 to the position of Fig. 5, the frictional force on the head 109 causes the drag links 108 to lift pawl 107 clear of ratchet 98 so that said pawl has no tendency to rotate the feed roller backwardly. This construction avoids the necessity for using a non-return pawl and also prevents excessive wear on the fine teeth of the ratchet 98 which would result if a conventional ratchet-and-pawl mechanism were used.

In order to prevent the drag on the card which would result if feed roller 96 remained in contact with the card after the rolls 112, 113 become effective, means is provided to lift the cards free of the feed roller 96 for a short time. This means includes a member 115 (Figs. 5, 6, and 20) which is L-shaped in cross section and is vertically movable a limited amount between the edge of plate 71 and the left-hand edge of casting 69 by which plate and casting member 115 is guided vertically. Secured to the ends of member 115 are two bars 116, 117 which extend downwardly (Fig. 20).

The lower end of bar 116 is guided by two pins 118 carried by the front frame 52 while the bar 117 is guided by a plate 119 which overlaps the lower end of said bar and is secured to the edge of bar 94. Integral with member 115 adjacent bars 116, 117, respectively, are two cam fingers 120 which bear on cams 121 secured to shaft 105. Springs 122 interposed between sockets in casting 69 and the cam fingers 120, press the latter against cams 121. The cams 121 are so timed with respect to cam 104 that at the point where a card advanced by the feed roller 96 is gripped by feed rollers 112, 113, member 115 will lift this card and others above it an amount sufficient to clear the roller 96. It will be noted in Fig. 5 that the top surface of member 115 slopes downwardly to the left so that the left-hand edge of member 115 virtually makes only line contact with the cards and reduces drag on the cards to a minimum.

V. CARD THROAT MECHANISM

An improved card throat mechanism is provided to prevent more than one card at a time from passing into engagement with the feed rolls 112, 113. This mechanism is best shown in Figs. 5, 6, 18, 18a, 20 and 21. Mounted in a shouldered hole in the left hand edge of plate 71 (Fig. 5) is a throat button 123 of some hard material such as glass, porcelain, or agate and retained in place by a plate 124 secured to plate 71 by means of screws 124a.

The throat button 123, as will be seen from Fig. 18a, is generally circular in plan view and has a nick 123a which may cooperate with one of the screws 124a securing plate 124 to plate 71 to prevent rotation of the button in the shouldered hole in plate 71. The button also has two flat inclined surfaces 123b (see Fig. 18 also) which slope from a central flat surface 123c downwardly toward plate 71 on the right and left hand sides (Fig 18) of the button. The flat surface 123c thus extends parallel with the left hand edge of plate 71. While it is more convenient to make button 123 with the circular shape shown in Fig. 18a, it might also be made with a different shape, for instance, it could be oval.

In order to prevent any tendency of plate 71 to bow or sag downwardly a post 125, which is reduced in diameter at its upper end, is adjustably threaded into the leg casting 50 (see Fig. 2) and the reduced end abuts the lower surface of plate 124.

Referring to Figs. 5, 6 and 21, there is secured to the left-hand face of plate 68, at the center of its lower edge, a plate 126 which has a rectangular vertical groove or slot 127. A member 128 is slidably mounted in the slot 127 so as to be vertically movable. A long screw 129 is rotatably mounted in blocks 68a, 68b secured to plate 68 and the lower end of this screw is threaded into a long hole in the member 128. A shoulder in screw 129 abuts lug 68a, while a set screw 68c threaded into the plate 68 adacent lug 68b provides a means for locking the screw 129 against rotation. By loosening set screw 68c and turning screw 129 the member 128 may be adjustably raised or lowered as desired.

The lower end of member 128 is offset to the right (Fig. 5) as far as the right-hand surface of plate 68 and is beveled or curved at 128a to correspond with somewhat similar surfaces 69c formed in the posts 69a. As a consequence of this construction, the cards are gradually pushed to the left as they descend in the master card hopper. The left-hand lower part of the member 128 has an inclined face which slopes upwardly and to the left away from the button 123. This face has a shallow slot 128b (Fig. 21) shaped like an inverted T and rectangular in cross section and in this slot is slidably mounted a T-shaped plate 130. A thick plate 131 attached to the inclined surface of member 128 in front of plate 131 holds the latter in the slot but permits this plate to slide freely.

The plate 131 may be termed the throat block and is beveled as shown in Figs. 5 and 21. The beveled edge is just over the center of the button 123 and is spaced therefrom by rotating screw 129 to provide a narrow space, or "throat" as it is called to permit passage of only one card. In order to prevent plate 130 from obstructing this throat a stop screw 132 is provided which is threaded into a hole in member 128 extending at right angles to the plate 130. Screw 132 has a point shaped like a frustum of a cone which projects into a countersunk hole in plate 130. Obviously, by adjustment of the screw 132, the plate 130 may be raised or lowered a limited amount due to the camming action of screw 132 on plate 130.

Plate 130 has a beveled edge which smoothly joins the lower edge of surface 128a to the edge of throat block 131 when plate 130 is properly adjusted. Thus, normally the left edges of the cards are smoothly guided downwardly to the beveled edge of throat block 131. As the relation between throat block 131 and member 128 must be always maintained constant, the throat block it attached to said member with both dowel pins 133 and screws 134 and is provided with a hole to accommodate the conical end of screw 132.

Plate 130 is designed to move vertically a slight distance, limited of course, by the conical end of screw 132. This yielding movement is resisted by a spring 135 interposed between a shoulder on an adjusting screw 136 and a lug formed in the upper end, or shank, of the T-shaped plate 130. The screw 136 is threaded into a bracket 137 secured to plate 126.

If it should happen that the two lowest cards in the hopper have more than the normal tendency to stick, both cards will tends to pass through the throat together. Such tendency to stick together often results from variation in the co-efficient of friction due to roughened spots on the surface of the cards, dampness, or other causes. Abnormally high humidity of the atmosphere, for instance, may cause the cards to stick together slightly more than is usual. In such cases, the second card from the bottom will exert a pressure on the beveled edge of the T-shaped plate 130 sufficient to cause plate 130 to be carried upwardly a slight amount in slot 128b against the tension of spring 135, permitting the left-hand edge of the second card to strike the right-hand inclined surface of throat block 131. As a result, the second card will be positively held by throat block 131 and plate 130 but the lowest card will pass through the throat and be gripped by the feed rollers 112, 113. After the first card has passed from under the second card, the spring 135 acting on plate 130 will force the leading edge of the first card down behind the throat, there now being no force tending to feed the second card through the throat. This downward movement of the second card to take the place of the first card is assisted to some extent by follower weight 70 and the remaining cards.

VI. CARD LIFTING MECHANISM

Cards have a tendency to warp at times, particularly when kept in the files for long intervals without taking the precaution of adjusting the drawer follower plates to hold the cards tightly in a flat condition. As a rule the cards have a tendency to warp alike, so that they either all bulge upwardly or all bulge downwardly when placed in the hoppers DH, MH. Usually this warping is so slight that the follower weights 70 are sufficient to flatten the cards in the hoppers but at times the warping may be so serious as to make it impossible for feed roller 96 to grip the first card, that is, the cards may bulge upwardly enough to clear the roller 96 if the bottom of the hopper were flat. In case the cards bulge downwardly instead of upwardly, the leading edge of the first card may project upwardly far enough to lift the plate 130 so that the throat block 131 prevents feeding of the first card.

In order to enable the friction feed mechanism to feed cards that are too badly warped to be flattened merely by weight 70, there is provided a hand-operated card lifting device by means of which the cards may be temporarily raised to a position to ensure proper feeding by the feed roller 96 or prevent the stoppage of feed by engagement of the first card with the throat block 131. This mechanism is best shown in Figs. 5 and 25.

The posts 69a and casting 69 have vertical slots cut therein (Fig. 5) which guide card lifter elements 138 for vertical movement. The elements 138 have heads 138a (Fig. 25) which project underneath the trailing edge of the first card and at 138b partly conform to the curvature of the surfaces 69c on posts 69. Each member 138 is provided with rack teeth 138c (Fig. 5) at its lower end which mesh with a pinion 139 fixed to a shaft 140 journaled in frames 52. Secured to shaft 140 adjacent the front side of rear frame 52 is a disc 141 while an operating handle 142 is secured to said shaft behind the rear frame 52. A four-pronged friction spring 143 is interposed between the hub of handle 142 and the rear face of frame 52 and causes friction disc 141 to press firmly against frame 52 and yieldingly retain operating handle 142 in any position to which it is moved by hand.

It will be noted from Figs. 5 and 25 that the top surface of the casting 69 is depressed below the top surface of plate 71 and that the top of member 115 slopes downwardly from the top surface of plate 71 to meet the corresponding surface of casting 69. If the cards bulge upwardly so that the feed roller 96 does not touch the first card, the handle 142 is turned clockwise (Fig. 5) to move the members downwardly toward the position shown by solid lines in Fig.

25 far enough to permit the first card to contact feed roller 96. On the other hand, if the cards bulge downwardly so that the first card rests on the feed roller 96 but its leading edge is curled upwardly above the throat, the handle is rotated counterclockwise (Fig. 5) to lift the trailing edges of the cards, that is, in a sense to rock the cards on the feed roller 96 as a pivot enough to bring the leading edge of the first card flat on plate 71 behind the card throat.

The dotted lines in Fig. 25 indicate the position the heads 138a may take to compensate for a moderate downward bulge in the cards. Under normal conditions where the cards are flat or only very slightly bulged downwardly, the heads 138a should be set to a position approximately half-way between the two positions shown in Fig. 25. The depression of the top surface of casting 69 provides a space to accommodate the trailing edges of cards which are badly bulged upwardly.

VII. Card Registering Mechanism

After leaving the hoppers DH and MH the cards are delivered to card registering mechanism which automatically compensates for any slight displacement of the cards transversely of their line of travel to ensure that the card analyzing mechanism will sense the holes in the cards correctly.

The card registering mechanism for the master cards is located immediately to the left of the master card hopper MH in Figs. 2, 5, and 6. The delivery of cards to the registering mechanism is controlled by a master feed magnet MFM (Figs. 2 and 5) mounted in an L-shaped support 144 secured to the rear frame 52 behind bar 94. The vertical leg of the support 144 has a rectangular notch 144a (Figs. 5 and 20) and adjacent such notch the support is provided with a knife-edged pivot block 144b on which the armature 145 is pivoted, the armature having two shoulders 145a formed with knife edges to engage the sides of the armature support 144 adjacent notch 144a. A spring 146 normally holds the armature against a stop pin 147 and also keeps the respective knife edges 145a on block 144b and armature 145 in proper pivotal contact with the armature and block, respectively.

The cam block 103 has a latch lug 103b adapted to be engaged by a latch block 145b secured to the right-hand end of armature 145. As long as magnet MFM is deenergized, lug 103b is unobstructed permitting the bell cranks 99 to rock and operate the feed roller 96 through ratchet 98 and pawl 107 as described above. On the other hand, if magnet MFM is energized, the latch block 145b will be moved into the path of lug 103b and prevent operation of bell cranks 99 by spring 102 and cam 104 rotates. In other words, the energization of magnet MFM stops feeding of cards from the master card hopper MH. A similar magnet DFM (Fig. 2) is associated with the detail card hopper DH.

The feed rolls 112, 113, of both hoppers are rotatably mounted in the plates 53, 54 (Figs. 5 and 6). The lower feed rolls 112 are mounted in fixed bearings but the upper feed rolls 113 are merely vertically guided in slots in the plates 53, 54 and pressed toward rolls 112 by means of shoes 148 formed in the lower ends of plungers 149. The plungers 149 are loosely mounted in vertical holes in housings 150 and are guided at their upper ends by vertical holes in adjusting screws 151 threaded into the holes in housing 150. These housings are integral with frames 52. A spring 153 is interposed between the lower end of each adjusting screw 151 and a shoulder on the associated plunger 149 so as to press the latter downwardly. By turning screws 151 the contact pressure of rolls 112, 113 may be regulated.

The lower feed roll 112 is driven by a worm 154 on shaft 65 (Fig. 6) which meshes with a worm pinion 155 secured to the rear end of the roll 112. A pair of spur gears 156 interconnect rolls 112, 113 so that both are positively driven. A second pair of feed rolls 157, 158 are mounted in plates 53, 54 (see Fig. 10 also) and driven by a worm 159 on shaft 65, a worm pinion 160, and spur gears 161 like the worm 154, worm pinion 155, and spur gears 156. The feed roll 157, however, is smaller in diameter than the roll 112 but is driven at a higher speed, therefore the rolls 157, 158 will feed the cards at a faster speed than rolls 112, 113.

The card registering mechanism is located between the two sets of feed rolls 112, 113 and 157, 158. Slidably mounted in holes in plates 53, 54 are two support rods 162 (Figs. 5 and 6) the ends of which are slightly reduced in diameter to loosely fit in guiding holes in the plates 53, 54. The rods 162 pass through holes in six vertical guide members 163 and a front side guide 163a which are spaced apart by tubes 164 surrounding rods 162. Nuts 165 threaded on the rods 162 adjacent the rearmost guide member 163 and the front side guide 163a clamp the guide members 163 and rods 162 together to form a unitary structure which is slidable between plates 53, 54. A rear side guide 163b is fixed to the rear plate 53 a spaced distance therefrom as by means of a suitable spacer block.

The side guides 163a, 163b extend well above and below the line of travel of the cards in their passage from feed rolls 112, 113, to the feed rolls 157, 158. The guides 163a, 163b guide the edges of the cards and for this reason are slightly curved at the ends nearest the feed rolls 112, 113 in order to ensure that the cards will pass between the guides and not be struck by the ends of the latter. Members 163 merely support the cards and for that reason are slightly curved on their upper edges and extend into the spaces between the feed rolls 112, 113, and 157, 158 so as to support the cards throughout their line of travel between said feed rolls.

A stop pin 166 is adjustably mounted in plate 54 and projects forwardly, through a hole in the side guide 163b, close to the rearmost member 163 to limit rearward movement of the assembly to which the members 163 belong. A large hole in plate 53 in front of side guide 163a loosely holds a spring 167 which surrounds a pin riveted to said guide. This spring bears against both said guide and a plate 168 attached to plate 53 and covering said hole. The spring 167 tends to move the assembly including rods 162 and members 163, 163a toward the rear of the machine in Figs. 5 and 6.

A rod 169 is rotatably and slidably mounted in the plates 53, 54, the forward end being reduced in diameter like the rods 162. A shoulder in the rod 169 loosely fits in a hole in side guide 163a so that rod 169 is free to rotate in said guide. A nut 170 screwed tight against the shoulder on rod 169, however, prevents sliding movement of said rod in guide 163a, thus the rod 169 may be used as a means for operating the assemblage of parts including guide 163a.

Secured to a flat formed in the rod 169 is a card stop or gate 171 having a series of prongs 171a which extend into the grooves in feed roll 157 and are slightly hook-shaped at their ends (Fig. 5) so as to be adapted to engage the leading edge of a card before it is actually gripped by the feed rolls 157, 158 and hold such card in the registering mechanism. The rear end of rod 169 is provided with an arm 172 (see Figs. 3 and 10) to which is connected a spring 173 tending to rock the rod 169 clockwise (Figs. 3 and 5). The rocking movement of rod 169 caused by the spring 173 are controlled by a cam as will now be explained.

Pivoted on a slotted stud 174 (Figs. 6 and 10) carried by plate 54 is a cam follower arm 175 the lower end of which is rounded and engages the rear end of rod 169. A cam 176 secured to shaft 65 is engaged by a roller mounted on arm 175. The spring 167 in Fig. 6 has the effect of causing the roller to press against the cam in Fig. 10 so that the entire assembly including rods 162, 169 and members 163, 163a is movable rearwardly under control of cam 176. The cam 176 turns at the rate of one revolution per card cycle of the machine.

The spacing between rolls 112, 113 and 157, 158 is slightly less than the width of a card so that a card will be stopped by the fingers 171a before the card has passed from contact with rolls 112, 113. As a result the card will be warped or bowed upwardly as shown in Fig. 5 by the action of rolls 112, 113, and will be maintained in this position by these rolls.

The cam 176 is so timed that as soon as the feed rolls 112, 113 relinquish their grip on the card, the front side guide 163a will push the card rearwardly against rear side guide 163b if the card happens to be a little too far forwardly, thereby bringing the card into proper alignment for subsequent sensing of the punched holes by the card sensing mechanism.

VIII. CARD SENSING MECHANISM

The card sensing mechanism is shown in Figs. 2, 5, and 6. Mounted on a shaft 177 journalled in plates 53, 54 is a master card contact roll MCR which consists of a metallic tube insulated from shaft 177. This contact roll is driven by shaft 65 through a worm 179 fixed to said shaft and a gear 180 fixed to shaft 177 and rotates at the same speed as feed roll 157. Another shaft 181 mounted above shaft 177 is driven by the latter through gears 182. Secured to shaft 181 is a feed roll 183 which is of the same diameter as the contact roll but is made of insulating material. The roll 183 has eighty-two slots cut therein of which eighty are spaced to correspond with the column positions of a standard 80-column Hollerith record card, while the other two slots correspond with the two portions of a card between the shorter edges and the 1st and 80th column positions, respectively. When 34 or 45 column cards are used, the roll 183 will have 36 or 47 slots, respectively.

Co-operating with master contact roll MCR is a pair of spring contact members 184 (Fig. 4) which are insulatably mounted on a block 185 secured to plate 54 and wipe on the surface of the contact roll.

A flat block of insulating material 186 (Fig. 5) is mounted between plates 53, 54 above the feed roll 158 and to the right of roll 183, the block being fastened to bars 187 secured to plates 53, 54. One of the bars 187 has secured to its underside a card guide comb 188 having fingers extending downwardly toward and close to the roll 158 (see Fig. 10 also). The block 186 is somewhat longer than a card and has as many transverse slots cut therein as there are slots in the roll 183. A brush carrier 189 is mounted in each slot and is crimped or otherwise fastened to a master card sensing brush MB which preferably comprises a small bundle of fine steel wires. A pair of strips of insulating material 190 secured to block 186 holds the carriers 189 firmly in their slots. Terminal lugs 189a are formed in the carriers 189 to provide a means for establishing electrical connections to the carriers from a suitable cable (not shown). Due to the closeness of the spacing of carriers 189, the terminal lugs are staggered so as to provide an adequate air space between the wires connected to these lugs to prevent flashovers. Each brush MB extends downwardly at an angle of approximately 30° to the horizontal through one of the slots of roll 183 and bears lightly upon the contact roll MCR when no card is between the latter and roll 183.

The extreme rearward and forward brushes are designated RMB and LMB in Fig. 16 to signify that they bear on the right-hand and left-hand edges of the card, respectively.

A substantially similar construction is associated with the detail card hopper DH but there are only eighty brushes DB provided which correspond with the column positions of the detail cards. The reason for using two extra brushes in the master card side of the machine will be explained more fully hereinafter. The detail card contact roll is designated DCR in Fig. 16.

Cards are guided from the feed rolls 157, 158 to the rolls MCR, 183 by a pair of spaced guide bars 191, 192 made of insulating material. The upper bar 192 is secured to a metallic cross bar 193 mounted on plates 53, 54 and is slotted along its left edge to provide tongues which extend into the slots in roll 183 behind brushes MB. These tongues confine the brushes MB in the slots in roll 183. The lower bar 191 is secured to plates 53, 54.

A pair of feed rolls 194, 195 (Figs. 2, 4, and 6) are provided to the left of the rolls MCR and 183, and are spaced from the latter a distance slightly less than the width of the cards. The rolls 194, 195 are driven by a worm 196, worm pinion 197 and spur gears 198 similar to the gearing 159, 160, 161 driving feed rolls 157, 158 and at the same speed. Feed roll 194 is mounted in stationary bearings in plates 53, 54, but the feed roll 195 is mounted in bearings carried by arms 199 pivoted in the plates 53, 54, which are slotted to permit vertical movement of the roll 195. Springs 200 attached to arms 199 urge the roll 195 into contact with roll 194.

Figure 4:
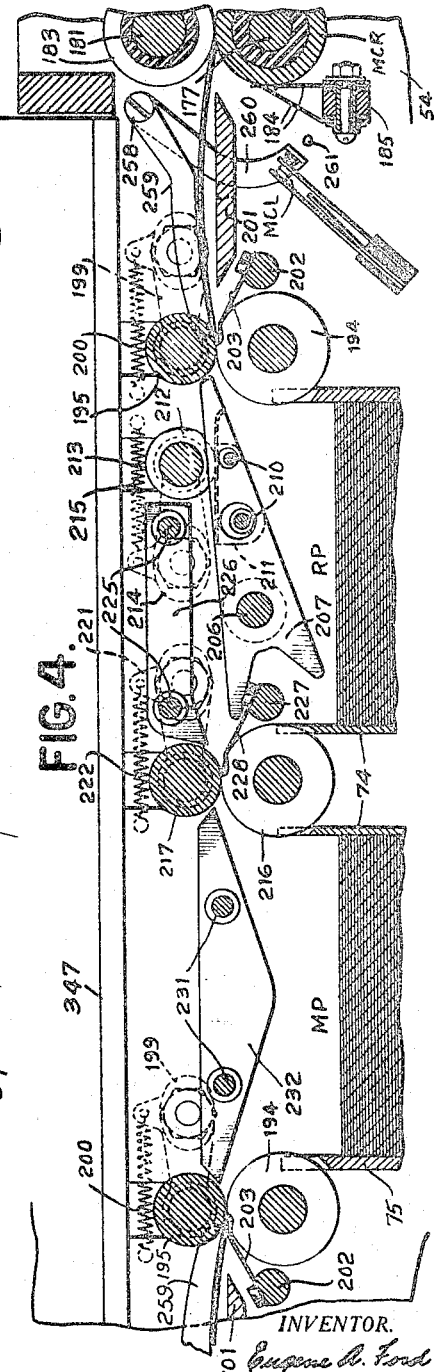
Fig. 4 is an enlarged vertical longitudinal section of the part of the machine appearing above the detail and master card receiving pockets.

A plate 201 (Figs. 2, 4, and 5) secured to plates 53, 54 provides support for and guides the cards in their passage from rolls MCR and 183 to rolls 194, 195. A rod 202 is journaled in plates 53, 54 and has a flat to which is fastened a card stop or gate 203 similar to the card gate 171. An arm 204 (Fig. 3) is secured to the rear end of the rod 202 behind plate 54 and a spring 205, similar to spring 173, is attached to the arm and tends to rock the card gate into position to stop a card as shown in Fig. 4.

Up to this point all the mechanism described, save for the two additional brushes RMB, LMB, is duplicated and designated with similar reference numerals on the detail card side of the machine. The friction feed mechanism, feed rolls, contact rolls, and other parts are reversed in position and direction of rotation on the detail card side so that the detail cards are fed from left to right instead of from right to left. Also the feed rolls 194, 195 on the detail card side rotate at the same speed as rolls 112, 113.

IX. Pocket Deflector Mechanism

Associated with the reject pocket RP is a deflector mechanism which is designed to determine whether the master cards are to fall directly from master card feed rolls 194, 195 into reject pocket RP or to be conveyed to the matching pocket MP. This deflector mechanism is shown in Figs. 2, 3, 4, 6, and 7. Secured to a cross shaft 206 journaled in plates 53, 54 are three deflector members 207 shaped roughly like arrow heads in outline (Fig. 4). An arm 208 (see Figs. 3 and 7) is fixed to the rear end of shaft 206 and a spring 209, attached to the arm and a fixed pin, tends to rock the shaft 206 in a direction to hold the members 207 in a position to cause all master cards to be deflected downwardly into the reject pocket RP as shown in Fig. 4. This movement of shaft 206 is controlled by means to be described later.

Two rods 210 (Fig. 4) are secured to the plates 53, 54 and pass through large holes in the members 207. These rods support a pair of card guides 211 over which cards may pass when the members 207 are rocked clockwise from the position of Fig. 4. A feed roll shaft 212 (Figs. 4 and 6) is provided with feed rolls 213 above guides 211 and is journaled in arms 214 actuated by springs 215. The feed rolls 213 are adapted to engage a card delivered from feed rolls 194, 195 and feed said card to the left to a similar pair of feed rolls 216, 217. The latter are driven at the same speed as rolls 157, 158 by a worm 218 on shaft 65, and the coacting worm wheel 219, and spur gears 220. The upper feed roll 217 is mounted on arms 221 actuated by springs 222 as in the case of the feed rolls 194, 195. The feed roll shaft 212 is driven by an idler gear 223 meshing with the upper gear 198 and a gear 224 on shaft 213. Rolls 213 have the same peripheral speed as rolls 157, 158.

Two rods 225 (Figs. 4 and 6) secured to plates 53, 54 support the guide members 226 which guide the cards into the feed rolls 216, 217. A rod 227 carries a card stop 228 similar to card stops 171, 203 and is similarly provided at its rear end with an arm 229 and spring 230. The pocket side plates 74, 75 are slotted above their upper edges to accommodate the raised roll surfaces of feed rolls 194, 195 and 216, 217.

A pair of rods 231 is mounted in plates 53, 54 above the matching pocket MP and support three guide members 232 adapted to deflect both detail and master cards into the matching pocket MP. The guides 211, 226, 232 are spaced on their respective rods by suitable tubes.

X. Control Mechanism for Card Stops and Deflector

The master card stops 171, 203, 228 are controlled by mechanism shown in Figs. 3 and 7. Journaled on a stud 233 carried by the rear face of plate 54 is a cam follower lever 234 having a rounded nose cooperating with a cam 235 (Fig. 6) secured to the rear end of feed roll 112 adjacent gear 155. A bar 236M (Figs. 3 and 7) is pivoted at its right hand end to the lever 234 and at its left-hand end is slotted to ride on a pin 237 carried by one arm of a lever 238 secured to a shaft 239 journaled in plates 53, 54. The bar 236M has three pins 240 against which the springs 173, 205, 230 yieldingly hold the arms 172, 204, 229, respectively. The bar 236M also has a notch with which a pawl 241 pivoted on plate 54 and actuated by a spring 242 is adapted to engage. Normally, movement of the pawl 241 into the notch is prevented by a pivoted latch plate 243 actuated by a spring 244. The latch plate 243 acts as the armature of the master card stop magnet MS.

Pivoted on a long stud 245 carried by plate 54 (Figs. 3 and 6) is a cam 246 which is secured to a gear 247 meshing with an idler gear 248 carried by another stud 249. The latter is mounted on a bracket 250 secured to bar 55. This idler gear 248 meshes with a gear 248a on the feed roll. The driving ratio of gears 247, 248a is such that cam 246 turns at the rate of one revolution per card cycle of the machine. Cam 246 actuates pawl 241 to restore it to latching relation with the latch plate 243.

With pawl 241 latched in the position of Fig. 3 by latch plate 243, the bar 236M will be drawn to the right under control of cam 235 once per cycle by a spring 251 attached to the lever 234 and to a fixed pin, thereby rocking the card stops 171, 203, 228 counterclockwise in unison out of the path of the cards. However, if the selector magnet MS is energized, latch plate 243 will release the pawl permitting it to be drawn by its spring 242 into the notch in bar 236M thereby preventing said bar from moving to the right to withdraw the card stops from the path of the cards. Thus, each time magnet MS is energized, the cards will be engaged by the card stops and prevented from feeding into either pocket or passing out of the card registering mechanism.

A similar bar 236D is provided on the detail side of the machine for the two cards stops 171 and 203 which control the feeding of detail cards. This bar is operated by mechanism like that described above which is controlled by a magnet DS. The right-hand end of bar 236D is supported and guided by a stud 252 carried by plate 54.

The deflector shaft 206 is controlled by mechanism shown in Fig. 7. A pin 253 on arm 208 extends into a slot in bar 236M, spring 209 tending to cause the pin 253 and hence arm 208 to follow the movements of bar 236M. Mounted on bar 55 below the arm 208 is a control magnet CRM called the card reject magnet. The armature 254 of this magnet engages the lower end of the arm 208 and holds said arm in a position to permit cards to pass over the guide members 207 into the matching pocket. When magnet CRM is energized, the arm 208 is released permitting spring 209 to move the arm 208 in unison with the card stops 177, 203, 228 as bar 236M moves to the right. This causes the deflector members to rock counterclockwise (Fig. 4) to deflect master cards into the reject pocket RP.

A link 255 pivoted on pin 237 has a slot engaging pin 253. The front end of shaft 239 is provided with a finger piece 256 (Fig. 1) having a pin (not shown) adapted to enter either of two holes in a plate 257 secured to the framework between plates 74, the shaft 239 passing through plate 257 Shaft 239 has limited forward sliding movement in its bearings limited by a collar and resisted by a coil spring (neither of which is shown). By pulling forwardly on finger lever 256, the pin therein may be disengaged from one of the holes and the shaft then may be turned to cause the pin to enter the other hole. When the finger lever is set in the left-hand hole which is the "match" position, the link 255 occupies the position of Fig. 7 permitting arm 208 to move to a position to cause cards to be deflected into the reject pocket if and when magnet CRM is energized. On the other hand, if the pin is in the right-hand hole, link 255 takes a position where pin 253 abuts the right-hand end of the slot in said link, the arm 208 will be held in the position of Fig. 7 and all master cards will be deflected in succession into the match pocket and magnet CRM will have no effect. In other words, in the "match" position of lever 256, all detail cards will fall in the detail pocket and master cards may fall in either pocket depending on the control exercised by magnet CRM, whereas in the "interleave" position all cards, both master and detail, fall in the match pocket.

In the "interleave" position a pin 238a on lever 238 engages arm 229 and holds the card stop 228 out of the path of the master cards.

XI. CARD LEVERS

Means are provided on both sides of the machine to detect the presence of cards in the card registering mechanism and in the spaces separating the pairs of feed rolls 194, 195 and 183, MCR. Pivoted on screw studs 258 (Figs. 2, 4 and 6) are card levers which consist in each case of two arms 259, 260 integrally joined by a hub. Arms 259 are disposed in the paths of the detail and master cards while arms 260 extend downwardly between plate 54 and are provided with bent-over lugs engaging insulating pins on card lever contacts designated MCL, MCLR in the case of the master card side of the machine and DCL, DCLR in the detail card side. The contacts MCLR, DCLR are associated with the master and detail card registering mechanisms while contacts MCL, DCL are associated with the card stops 203. When no cards have been fed from the hoppers the arms 260 rest on stop pins 261 on plate 54 with the contacts MCL, DCL open and arms 259 in the path of the cards. As a card emerges from the master card hopper, for example, the leading edge engages the lever 259 (Fig. 5) and rocks the card lever sufficiently to close contacts MCLR. The card lever contacts are made sufficiently flexible to permit the slight bowing of the cards without affecting the contacts so that they remain closed regardless of whether the cards are flat or slightly bowed due to engagement with the card stop.

XII. HOPPER CONTACTS

Associated with the hoppers DH, MH are hopper contacts designated DHC in the case of the hopper DH and MHC in the case of hopper MH. The construction of these contacts is illustrated in Fig. 5 wherein it will be seen that contacts MHC are insulatably mounted on a bracket 262 secured to casting 69.

A pin 263 of insulating material is secured to the upper contact member and projects through a hole in casting 69 far enough to be engaged by the cards in hopper DH. When the hopper contains cards, the weight 70 and the cards cause pin 263 to press the contacts MHC together. When the last card has been partly withdrawn from the hopper, pin 263 moves into a hole 70a in follower plate 70 permitting the contacts MHC to open.

The spring blades of contacts MHC, DHC have sufficient resiliency and their supports are so bent that a considerable amount of vertical movement of pin 263 is permitted before the break occurs in order to allow for the bowing or warping of the cards and the adjustment of their trailing edges produced by hand lever 142.

XIII. PLUG BOARDS

Two plug boards are provided, one on each side of the machine. Only one of these plug boards is shown in the drawings and is the detail card plug board designated 264 in Fig. 2. These plug boards are protected by doors 265 (Fig. 1) and may be constructed in any well known way. The detail card plug board has 80 plug sockets DPS (Figs. 2 and 16) which are directly connected to the detail card brushes DB while the master card plug board has 80 plug sockets MPS connected to the brushes MB. Each plug board also has sixteen plug sockets, designated MAPS in the case of the master card plug board and DAPS in the detail card plug board, which are connected to sixteen master analyzer magnets MM on the master side of the analyzer and the corresponding sixteen magnets DM on the detail side of the analyzer, respectively.

The master card plug board also has two plug sockets RMPS (Fig. 16) and LMPS connected to the brushes RMB and LMB, and a plug socket UPS called the "unmatch" plug socket.

XIV. ANALYZING MECHANISM

The card reading brushes MB, DB control analyzing mechanism through the magnets MM, DM which mechanism compares the values punched in a master card and with those punched in a detail card to determine which card has the higher value. The analyzing mechanism controls the machine to dispose of the cards in various ways, according to the type of operation desired, through the feed magnets MFM, DFM, reject magnet CRM, and selector magnets MS, DS. The mechanical construction and basic principles of operation will be described in detail in the present section while the various types of operation of which the machine is capable will be described in detail in following sections.

The analyzing mechanism is contained in a case 266 (Fig. 1) supported by the frame work and its mechanical construction is shown in detail in Figs. 9, and 11 to 15, inclusive. The mechanism is supported by four plates 267 to 270 (Figs. 11 and 12) of which the plates 269, 270 are secured to the lower edges of plates 267, 268, respectively. The plates 267, 268 are joined near their upper edges (Fig. 12) by five bars 271 on which are mounted the analyzer magnets DM, MM, which are arranged in four rows and are staggered (Fig. 11) so as to utilize the space available as much as possible. The coils of each magnet are mounted on an L-shaped support 272 which is secured to a small plate 273 by means of screws 274 which are threaded into the cores of the coils. Each plate 273 is secured to a pair of the bars 271 by means of two screws 275.

The lower end of the vertical portion of each support 272 is provided with a wide rectangular notch or slot which is so cut as to provide a knife edge on which is pivoted an armature 276. These armatures have notches 276a or slots (see Fig. 11) formed with knife edges which engage the opposite sides of the lugs formed by the slots in the supports 272 whereby the armatures are prevented from being displaced from the knife edges on the supports. Springs 277 anchored to the armatures 276 and cross rods 278 hold the armatures away from the poles of their respective magnets. Riveted to each armature 276 is a small latch block 279, the blocks for the armatures of magnets DM being disposed in a single line while the blocks corresponding to magnets MM are similarly disposed in another line.

Two bars 280 are mounted in plates 267, 268 beneath and parallel with the two rows of latch blocks 279. Each bar 280 has a longitudinal groove in which is secured a pivot wire 281 and also has a number of vertical slots in which are mounted stop pawls 282, the latter being pivoted on wires 281. The tail of each pawl 282 projects upwardly and engages the right hand side of one of the latch blocks 279. The tails of pawls 282 act as stops to limit the downward movement of the armatures 276 caused by springs 277. Springs 283, attached to the tails of pawls 282 and to a bar 284, hold the tails of the pawls in contact with the right hand sides of latch blocks 279. The bars 284 are in each case secured to the ends of bars 280 by means of two arms 284a integral with the associated bar 284.

Figure 12:
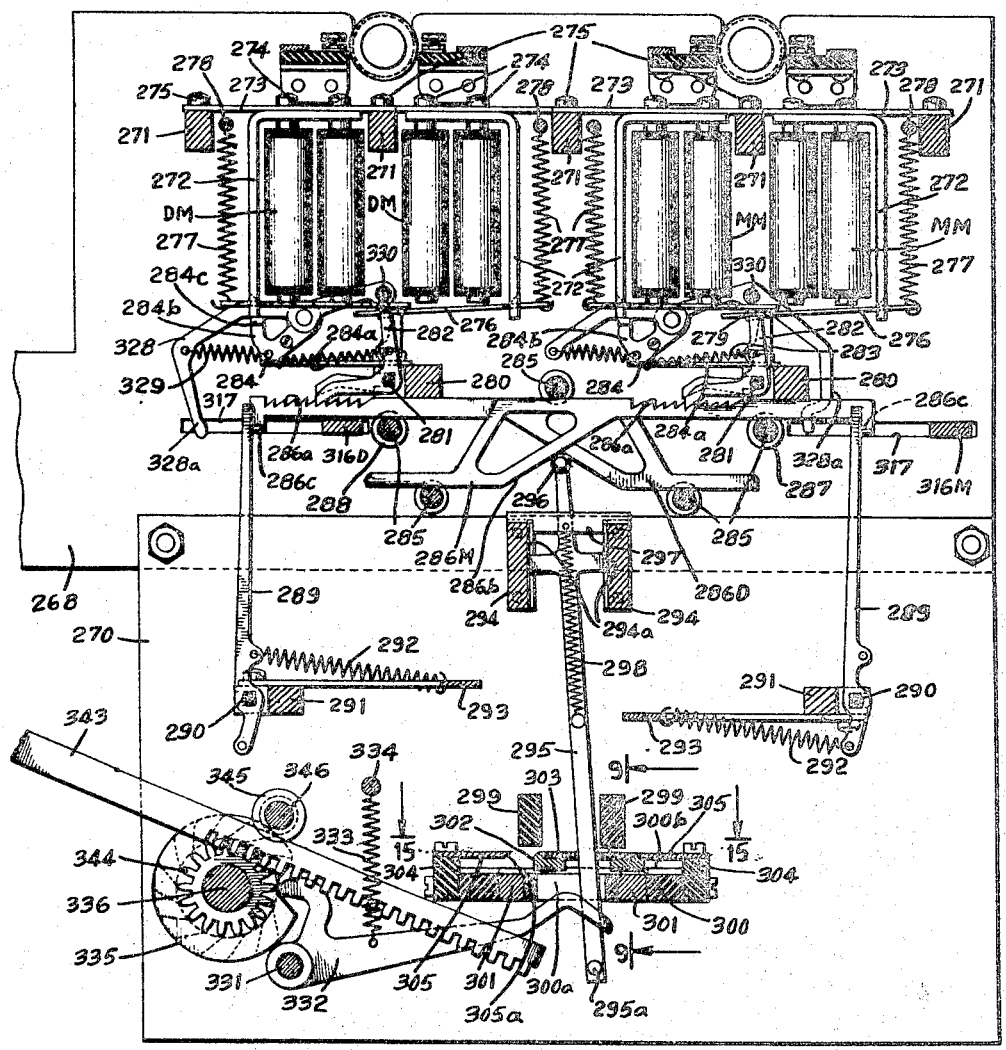
Fig. 12 is a vertical section on the line 12—12 in Fig. 11.

Mounted in plates 267, 268 are five cross rods 285 which support and guide two series of racks 286M, 286D which, for reasons which will be explained hereinafter, may aptly be called "scissors" bars. At this point it is desired to explain that each magnet MM is paired with a magnet DM and each pair of magnets is designed to control the comparing of the values punched in corresponding columns of the master and detail cards. Thus, the first and third magnets from the left in Fig. 12 are paired to correspond with one column of the cards while the second and fourth correspond to an adjacent column. There is a pair of scissors bars 286M, 286D associated with each pair of magnets MM, DM.

The scissors bars 286D, 286M of each pair are separated from each other by short collars 287 (Fig. 11) on rods 285, while longer collars 288 separate the adjacent unrelated scissors bars of the pairs. Each scissors bar 286D, 286M has a toothed portion 286a (Figs. 12 and 17) having ten interdental spaces corresponding to the numerical values 0 to 9. The pawls 282 of a related pair of magnets MM, DM are adapted to enter the tooth spaces in the toothed portions 286a of the pair of scissors bars 286M, 286D associated with the pair of magnets. Thus, the pawls 282 of the first and third magnets from the left, which are designated DM and MM, respectively (Fig. 12), cooperate with the toothed portions 286a in the bars 286D, 286M. This pairing of the magnets MM, DM with bars 286M, 286D is shown diagrammatically in Fig. 17 in which the punched hole values of the interdental spaces in the toothed portions 286a are indicated by small numerals on the bars 286M, 286D.

The bars 286M, 286D are adapted to slide on rods 285 and each pair is provided with oppositely inclined straight cam portions 286b. When the bars of a pair slide relative to each other, the cam portions have a scissors-like effect, hence the appropriateness of the term "scissors bar." Each bar also has a bent-over lug 286c (Fig. 12) engaged by the upper end of an operating lever 289. The levers 289 are pivoted on a pivot wire 290 secured in grooves in bars 291 which are constructed similarly to the bars 280. Springs 292, anchored to bars 293 like bars 284 and to the levers 289, tend to move the latter clockwise (Fig. 12), whereby the levers 289 tend to push the bars 286M, 286D to the right.

Secured to the plates 269, 270 beneath bars 286M, 286D is a pair of guide bars 294 which extend transversely of the scissors bars. The bars 294 are provided with a pair of confronting vertical grooves 294a for each pair of scissors bars and in each pair of these grooves is slidably mounted a cruciform switch lever 295, the cross bar of which is guided by the grooves 294a. The switch levers 295 are not only vertically slidable in grooves 294a but are adapted to rotate therein a limited amount. A pair of rollers 296 is mounted on the upper end of each switch lever 295 and engage the cam surfaces 286b of the associated pair of scissors bars 286M, 286D. Thus, by sliding the scissors bars relative to each other and to the rods 285, the switch levers 295 are caused to move both vertically and angularly distances dependent on the amount of sliding movement permitted bars 286M, 286D.

Bars 294 are also grooved transversely of their top edges to provide seats for a series of thin plates 297 of which there is one for each switch lever 295. Springs 298, anchored to the switch levers 295 and to the plates 297, tend to draw the switch levers upwardly so that rollers 296 of each switch lever are constantly engaged with the cam surfaces 286a of the associated pair of bars 286M, 286D. Angular movement of switch levers 295 is limited by a pair of bars 299 of insulating material secured to plates 269, 270.

The angular movements of switch levers 295 control analyzer switching devices the construction of which is best shown in Figs. 9, 11, 12, and 15. A plate 300 of insulating material is secured to plates 269, 270 and has a series of transverse slots 300a in which the lower ends of switch levers 295 are guided. The top surface of plate 300 is also provided with transverse grooves 300b shaped like a trapezoid for each switch lever 295. Adjacent both ends of slots 300a and between the grooves 300b the plate 300 is provided with metal inserts 301 which are beveled as at 301a (Fig. 9) so as to be flush with the inclined sides of grooves 300b.

Slidably mounted in each of the grooves 300b is a pair of switch blocks 302 having inclined faces which fit the inclined walls of the grooves and the surfaces 301a in the inserts 301. Each pair of blocks is joined together by a narrow thin strip or plate 303 of insulating material having a slot in which one of the switch levers 295 is loosely received.

Secured to the longer edges of plate 300 are two bars 304 of insulating material and mounted on the top edges of these bars are two contact strips 305 which have a beveled edge 305a adapted to engage a bevel in the switch blocks 302 as shown in Fig. 12. When any switch lever 295 is in its central or neutral position, the switch blocks 302 attached to its plate 303 will bridge the pairs of inserts 301 on opposite sides of switch lever 295 but the blocks 302 will be clear of both conducting strips 305. This condition is illustrated diagrammatically in Fig. 16 by the lowest three switch devices. It will be observed in this figure that two rows of blocks 302 and two rows of inserts 301 are provided, one row associated with the detail analyzer magnets DM and the other with the master analyzer magnets MM. With all the switch levers 295 in central position, it will be seen that all the inserts 301 of each row will be electrically connected together by switch blocks 302, but both rows will be insulated from the conducting strips 305. The uppermost plate 303 in Figs. 11 and 16 correspond and its switch blocks 302 will be associated with the units order of the record card field containing the serial number, classification number, or other data used as a basis for matching or other purposes. While the maximum capacity of the machine as disclosed herein is sixteen columns, requiring sixteen magnets DM, and sixteen magnets MM, only nine plates 303 with their associated parts have been shown in Fig. 16 for sake of simplicity.

Secured to the rear side of plate 268 (Figs. 11 and 13) are two brackets 306 and a guide strip 307 which is interposed between the plate 268 and the brackets. A slide 308 is mounted for reciprocatory movement in brackets 306 and has two sets of rack teeth 308a. Mounted on a bracket 309 secured to plate 52 is a short shaft 310 (Figs. 3 and 13) to the front end of which is secured a pair of gear sectors 311 which mesh with the two sets of rack teeth 308a. Secured to the rear end of shaft 310 is a pair of cam follower arms 312 carrying a roller 313 engaging a cam 314 on the rear end of feed roll 112 (see Fig. 6 also). A spring 315, anchored to a pin on plate 54 and one of the arms 312, holds roller 313 in contact with the cam 314. It is evident that slide 308 will be oscillated back and forth once per card cycle of the machine.

Slide 308 is provided at each end with a channel 308b (Fig. 11) in which channels are slidably mounted L-shaped members 316 each having arms 316D, 316M extending horizontally and forwardly to the right of the lugs 286c in scissors bars 286D, 286M, respectively. The spring-operated levers 289 tend to press the scissors bars to the right into contact with the arms 316M, 316D. The arms 316M, 316D are supported and guided by slots 317 cut in plates 267, 268, and guide 307 is cut away adjacent the slots in plate 268 (Fig. 13) to permit reciprocatory movement of arms 316D, 316M. Springs 318, attached to pins 319 on the members 316 and to pins on plate 268, tend to draw members 316 and the bars 316M, 316D to the right (Figs. 11 and 12). The pins 319 on the members 316 project downwardly through slots 308c in slide 308 (Fig. 14).

The members 316 are retained in the slots 308b by means of brackets 320 and blocks 321 (Figs. 11, 13, and 14) which are mounted on the slide 308 and slightly overlap the members 316. A three-armed pawl 322 is pivoted on the rear face of each block 321 and to one arm of each pawl is attached a spring 323 anchored to a lug formed in the adjacent bracket 320. Spring 323 tends to engage the pawl 322 with a notch 316a in the adjacent member 316. Such movement of pawls 322 is prevented under certain conditions by stop screws 324 on small blocks 268a riveted to the back of plate 268. When slide 308 oscillates, springs 318 tend to hold members 316 and arms 316D, 316M in the position shown in Figs. 11 to 14.

Figure 14:
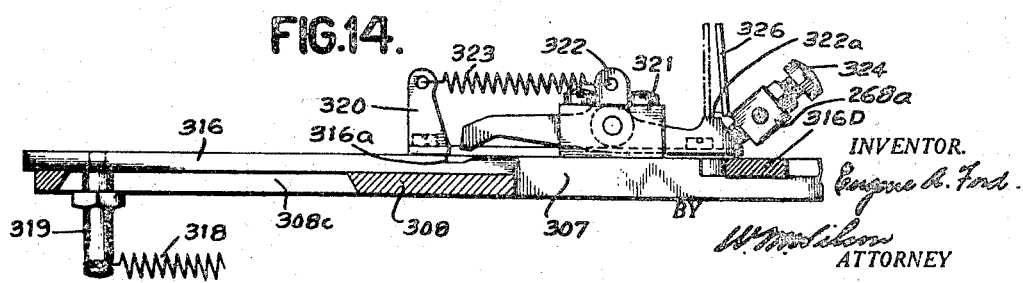
Fig. 14 is an enlarged view of mechanism controlled by the detail selector magnet.

At the right-hand limit of travel, the tails of pawls 322 are engaged by the stop screws 324 which coact with cam surfaces on said pawls to hold them clear of notches 316a as shown in Fig. 14. As slide 308 moves to the left from the position of Fig. 14, the tail of each pawl 322 will move away from its stop screw 324 and be rocked by its spring 323 into engagement with the associated notch 316a, thereby coupling slide 308 and members 316 together for movement in unison to the left. Movement of one or both members 316 to the left causes the associated bar or bars 316M, 316D to push the scissors bars 286M or 286D, or both to the left, as the case may be, engaging any that may have been differentially positioned, until at the end of the leftward stroke of slide 308, all the scissors bars of one or both groups have been alined in readiness for movement in unison when the slide 308 moves to the right.

The selector operating cam 314 is so shaped that the right-hand movement of bars 316M, 316D has a fixed ratio to the speed of passage of the detail and master cards past the respective card sensing brushes whereby the notches in bars 286M, 286D will come opposite the noses of pawls 282 at about the time the index-point positions of corresponding value in the cards are being sensed by the brushes MB, DB. Reference to Figs. 17, 22, and 23 will make this operation clear.

The engagement of pawls 322 with notches 316a is selectively controlled by two magnets MSM, DSM called the master and detail selector magnets respectively, shown in Fig. 13. These magnets are quite similar in details of construction to other control magnets so far mentioned and are mounted on brackets 325 secured to the rear face of plate 268. Each has an armature 326 actuated by a spring 327. Each armature extends downwardly to a point just above a flat surface 322a formed in one of the pawls 322 (see Fig. 14 also) and is held by its spring 327 against the associated block 324. Magnet MSM is associated with the pawl 322 which controls movement of bar 316M by slide 308, while magnet DSM is similarly associated with the pawl which controls bar 316D.

Normally, with the magnets MSM, DSM deenergized, pawls 322 are free to couple bars 316M, 316D to slide 308. The flat 322a is of sufficient length whereby, when either magnet MSM or DSM is energized to move its armature 326 to the dotted position of Fig. 14, the end of the armature will prevent the pawl 322 from engaging the associated notch 316a as slide 308 moves to the left. In other words, the armatures 326, cooperate with the flats 322a long enough to cause the pawls 322 to miss the notches 316a and eventually drop on the smooth top surface of members 316. Thus, as long as both magnets are energized, both bars 316M, 316D will remain at rest and slide 308 will oscillate idly in its brackets 306.

The armatures of magnets MM, DM may have some tendency to stick due to residual magnetism and other causes, and to prevent this an automatic armature knock-off mechanism is provided. This mechanism is shown in Figs. 11 and 12. The ends of both bars 284 are formed with bracket-like portions 284b to which are pivoted levers 328. Springs 329, anchored to the bracket portions 284b and levers 328, hold the latter against the top sides of bent-over lugs 284c formed in the bracket portions 284b. The pair of levers 328 associated with each bar 284 supports a rod 330, which extends above the free ends of armatures 276. Each lever 328 has an extension 328a which projects downwardly into the path of one of the bars 316M, 316D. Near the end of the leftward movement of bars 316M, 316D, they engage extensions 328a and rock the levers 328 clockwise (Fig. 12) against the tension of springs 329. This causes rods 330 to move downwardly, thereby positively disengaging the armatures 276 from the poles of their magnets.

As bars 286M, 286D approach their leftward limit of travel, pawls 282 ride upon the smooth upper edges of these bars and are thereby rocked far enough to enable the latch blocks 279 to latch the pawls in disengaged position. It is about this time that rods 330 are moved downwardly. Thus, the rods 330 also are effective to force the armatures into latching position.

XV. Switch Selector Mechanism

In order to lessen wear on the analyzer switching devices of which the switch blocks 302 and inserts 301 form part, a selector mechanism is provided which may be set to limit the switching devices in operation to the number actually required. While the machine is disclosed as having sixteen columns of capacity for comparison of the cards, this number will seldom be needed.

The switch selector mechanism is designed to be settable to render inoperative those analyzing switching devices which are not to be used. This mechanism is shown in Figs. 1, 2, 11, and 12.

Each of the cruciform switch levers 295 is provided at its lower end with a stud 295a (Fig. 12). Loosely mounted on a cross rod 331 supported by plates 269, 270 is a series of cam follower levers 332 each having a crook or V-shaped notch on the free end adapted to engage one of the studs 295a. Springs 333, anchored to a cross rod 334 mounted in plates 269, 270, hold the cam follower levers 332 in contact with cams 335 secured to a shaft 336 which is rotatable in plates 269, 270. There are fifteen of the cams 335 and, beginning with the foremost cam (Figs. 11 and 12), which has the shortest dwell, the dwells are progressively longer and the cams are spirally disposed on the shaft 336 so that rotation of this shaft in a clockwise direction in Fig. 12 will cause the levers 332 to be similarly rotated progressively. This rotation of the levers 332 causes the V-shaped notches therein to engage the pins 295a and first cam the switch levers 295 into their vertical position, if not already in such position, and thereafter pull them downwardly slightly beyond the lowest position they could ever assume when operated by the scissors bars 286M, 286D. This relieves the scissors bars from the effects of friction in bars 294 and the load imposed on the scissors bars by springs 298. At the same time the levers 295 are removed from control by the scissors bars. The levers 295, being held in the vertical position, their switch blocks 302 will maintain the circuits through inserts 301 up to the foremost inserts of the switching devices in use, that is, the one corresponding to the highest denominational order of the field in the card. This will be more clearly understood by reference to Fig. 16 wherein the lower three switching devices have been disabled in the manner above described. It is necessary that the circuits be maintained with the wiring shown in Fig. 16 as the various card feed and stop magnets are connected to the lowest inserts 301 in Figs. 11 and 16.

The shaft 336 is rotated by means of a hand lever 337 (Figs. 1 and 2) having a spring-pressed plunger 338 provided with a narrow portion adapted to enter any one of fifteen holes 339 in a dial plate 340 secured to the front of the machine. A series of numbers ranging from 1 to 15 are engraved on plate 340 opposite the holes 339 to facilitate setting lever 337.

The lever 337 is mounted on the front end of a short shaft 341 journaled in a hub secured to plate 340. An arm 342 (Fig. 2) is secured to the inner end of shaft 341 and is pivoted to a link 343 which extends diagonally downwardly adjacent plate 269 (Figs. 11 and 12) at which point the link is provided with rack teeth meshing with a pinion 344 secured to shaft 336. A grooved roller 345 mounted on a stud 346 guides link 343.

Only fifteen cams 335 and levers 332 are provided on shaft 336 and there is no cam or lever associated with the units or rearmost switching device. When lever 337 is locked in the "1" position all the levers 332 will be depressed to disable all but the rearmost or units switching device in Fig. 16.

XVI. Miscellaneous Details

The usual glass shelf 347 (Figs. 1 and 2) may be provided as a convenient table for supporting stacks of cards. This shelf protects the feed rollers, and other parts from dirt and tampering and also facilitates location of jammed cards.

Conveniently, it may be made removable or liftable in well-known ways for inspection, repair, and lubrication of parts, or to remove jammed cards.

The usual spring clips 348 (Fig. 1) for the follower weights 70 may be provided for each hopper, to hold the follower weights when not in use or while cards are being placed in the hoppers DH, MH.

Duplicate start keys ST1, ST2 (Figs. 1 and 16) and stop keys SP1, SP2 are provided adjacent hoppers, DH, MH. These keys control starting and stopping of the machine.

A number of cam-operated contacts designated CC1 to CC7 in Fig. 16 are provided. The cams which operate these contacts are mounted on a shaft 349 in a cam box 350 (Fig. 1). The shaft 349 is driven at the rate of one revolution per card cycle by means including a worm 351 on shaft 65 (Figs. 3 and 6) meshing with a worm wheel 352 secured to the upper end of a vertical shaft 353. Shaft 353 is journaled in suitable bearings on the frame work and has at its lower end a worm 354 meshing with a worm wheel 355 on shaft 349.

The operation of the machine will now be described in detail in the following sections, each of which deals with a different type of operation.

XVII. Interleaving

The operation of interleaving consists in bringing together in the matching pocket correspondingly punched detail and master cards. It will be assumed that for each master card there is a detail card having the same identifying number, say an account number, as the master card, the account number being preferably but not necessarily punched in corresponding fields or columns of both cards.

It will be assumed that the account numbers are punched in columns 1 to 6 of both master and detail cards and may comprise any number from 000,001 to 999,999. All zeros must be punched in the detail cards and zeros must be punched to the left of the highest significant digit of the account number of the detail card, since scissors bars 286D would move to the "9" position if no hole appeared in the corresponding columns of the detail cards. Punching of zeros is not necessary in the master cards as scissors bars 286M always move to a zero position when no holes appear in the corresponding columns of the master cards.

The plug sockets DPS (Fig. 16) corresponding to columns 1 to 6 of the detail cards are plugged to the plug sockets DAPS corresponding to the six magnets DM assigned to the units to the 100,000's positions of the account numbers. Similarly the six plug sockets MPS corresponding to columns 1 to 6 of the master cards will be plugged through plug sockets MAPS to the six magnets or paired with the six magnets DM corresponding to columns 1 to 6 of the detail cards. With this plugging of the machine, there will be a pair of magnets MM, DM and their associated scissors bars 286M, 268D rendered operative for each column of the account number field. The effective scissors bars will be the upper six pairs in Fig. 11, of which the uppermost pair will correspond to the sixth or units column, and the lowest of the six to the first or 100,000's column of the card, respectively.

Lever 337 (Fig. 1) will be set opposite the "6" hole in plate 340 thereby drawing to the neutral position the ten switch levers 295 corresponding to the lower ten pairs of scissors bars 286M, 286D in Fig. 11. Lever 256 will be turned to the right to "Interleave" position thereby, through pin 238a (Fig. 7), moving the card stop 228 out of the path of the cards and, through link 255, locking the deflector elements 207 (Fig. 4) in a position to cause all master cards to pass to the matching pocket MP. The unmatch switch US (Fig. 16) will be left in solid line position and main switch S closed to start the motor generator MG. When the generator attains its proper terminal voltage, relay E will close its contacts E1 to permit starting the driving motor DM. Switch S1 is left in open position.

The master cards MC will be sorted into numerical order by account number and placed in the master card hopper MH (Figs. 1 and 2) face down, with the "9" position nearest the card throat. The detail cards DC will likewise be sorted into numerical order according to account number and placed in the hopper DH face down with the "9" positions next to the card throat. This is done so that the master and detail cards will all face in the same direction and the same index point positions coincide as the cards accumulate in the matching pocket MP.

The motor generator is now running, relay E has closed its contacts E1, and hopper contacts DHC, MHC are closed but the full pocket contacts FPC and card lever contacts MCLR, DCLR, MCL, DCL will all be open because no cards have been fed as yet and there are none in the pockets MP, RP or in course of feed.

Either of the start keys ST1, ST2 is now depressed, closing a circuit as follows: Left side of main switch S, wire W1, the start key contacts, relays RO, ST, A, and B, and wire W2, to right side of main switch S. Relay RO closes its contacts to establish a circuit through relays C and D between wires W3, W4 and relay C closes contacts C1 to establish a holding circuit for relays A, B, and ST. This holding circuit extends from the contacts of relay ST; through both stop key contacts SP1, SP2; and contacts SCM1, C1, and wire W1, to the left hand side of switch S. Contacts A1 of relay A and the contacts B1 of relay B close upon the depression of the start key and energize the driving motor DM through the contacts of relays A, B, and E in series, and the driving motor starts to turn. Relay D opens contacts D1 and relay C opens contacts C2. Since contacts CC6, CC7 do not close until late in each cycle and contacts DCL, MCL are still open, all the magnets DSM, MSM, DFM, MFM, DS, MS, CRM remain deenergized, or if the machine last stopped with contacts CC6, CC7 closed, none of these magnets can be energized long enough at the start to have any real effect. Also, as soon as the start key is released, relay RO is deenergized and opens its contacts to deenergize relays C and D allowing the contacts C2 and D1 to close and contacts C1 to reopen.

Since the holding circuit for relays A and B extends through contacts C1 of relay C, it is necessary to hold the starting key down until a card has entered both of the registering mechanisms, otherwise the deenergization of relay RO would break the circuit through relay C and cause motor DM to stop before the first cards could close the card lever contacts DCLR, MCLR.

During the first full cycle of the machine, feed magnets DFM and MFM are both deenergized thus allowing the friction feed mechanisms to advance the first card from the master and detail card hoppers MH, DH, respectively, and carry them into the card registering mechanism where they strike the card stops 171. Near the end of this first cycle the cams 176 will operate the registering mechanism to cause both the detail and master cards to be aligned with the card sensing brushes. Card lever relays C and D will remain energized when the first master card and first detail card enter the respective registering mechanism and close card lever contacts MCLR, DCLR. The presence of a card in both registering mechanisms holding contacts DCLR, MCLR closed, causes relays C and D to remain energized, permitting release of the start key.

Since contacts DCL and MCL are still open as the first full cycle comes to an end, and contacts C2 and D1 are open, none of the magnets DSM, DFM, DS, CRM, MSM, MFM, MS, and SCM will be energized and the card stops will be operated by cams 235 permitting the first cards from the hoppers to pass to the analyzing brushes. The first cards will be fed by feed rolls 157, 158 a short distance toward the contact rolls DCR, MCR during the last part of the first full cycle.

During the second cycle, the first cards will be conveyed past the respective contact rolls and analyzing brushes to close the contacts DCL, MCL. Also the second punched card in each hopper will be fed into the registering mechanisms and partly between the feed rollers 157, 158.

Since magnets MSM, DSM are deenergized during the first cycle, the bars 316M, 316D will be coupled to slide 308 and will travel to the left (Fig. 12) pushing all the slides 286M, 286D to the left as far as they will go. Bars 316M, 316D will then start to return to the right. Since brushes DB, MB are bearing on the bare contact rolls DCR, MCR, respectively, parallel circuits will be established through the magnets DM, MM as in the following two typical circuits (Fig. 16): Wire W3, switch US, brush 184, contact roll MCR, a brush MB, a plug wire, a magnet MM, and contacts CC4, CC5, to wire W4; also wire W3, contacts CC2, CC3, a magnet DM, a plug wire, brush DB, contact roll DCR, and brush 184, to wire W4.

All six active magnets MM will be energized at the "9" point in the cycle with respect to the master cards while the corresponding magnets DM will be energized at the "0" point with respect to the detail cards. Thus all six active scissors bars 286M will be stopped in the "9" position and the bars 286D in the "0" position. This causes the six switch levers 295 which have not been disabled to assume a position like the one shown in Figs. 12 and 17 due to the relation of the cam surfaces 286b. As a result, the upper six switch devices of the analyzer unit will assume positions like the sixth from the top in Fig. 16. This closes that part of the circuit between contacts MCL and wire W4, but no current can flow since contacts MCL do not close until near the middle of the second cycle.

During the second cycle, all the magnets in parallel with DSM and MSM, respectively, will remain deenergized, thus bars 316M, 316D will again be coupled to slide 308 and will first move to the left to restore the scissors bars 286M, 286D and then relatch the stop pawls 282. These pawls are relatched just before the brushes DB, MB start to sense the holes in the first detail and first master card, and bars 316D, 316M begin to move to the right in synchronism with the sensing of the cards.

It will be assumed for convenience that the first master card bears the same account number as the first detail card, and that the value "5" is punched in the units column, which is column 6 in the cards. Referring to Figs. 16 and 17, it will be assumed that the two scissors bars 286M, 286D, the magnets MM, DM, and other parts shown in Fig. 17 correspond to the units order represented by the uppermost analyzer switch designated "Units" in Fig. 16.

When the brush DB senses the "5" hole in column 6 of the detail card, magnet DM will be energized and pawl 282 in Fig. 17 will be released at the time the "5" tooth space in bar 286D is opposite the nose of pawl 282. Thus bar 286D will be stopped in the "5" position. Similarly, the magnet MM will be energized and cause bar 286M to stop in the "5" position. Due to the disposition of the cam surfaces 286B on each pair of scissors bars, when both are stopped in the same position, switch levers 295 will assume a vertical position. Thus, all six of the active switch levers 295 will assume vertical positions and none of the switch blocks 302 will touch contact strips 305.

This condition is illustrated by the lower three and upper four switch devices in Fig. 16. In other words, all of the switch devices and their levers 295 will be aligned in a central position in Fig. 16 when master and detail cards agree as to account number, regardless of the number of columns active.

Under these conditions no circuits can be established through the magnets in parallel with MSM, DSM through the analyzer switch devices and both cards will travel toward the match pocket MP and will be deposited therein during subsequent machine cycles. Since feed rolls 194, 195 on the detail card side rotate slower than rolls 194, 195 on the master card side and the central rolls 216, 217, the first detail card will enter the match pocket before the first master card.

If the second master card and second detail card also have the same account number, these two cards will be caused to move toward the matching pocket MP in similar fashion during the third machine cycle. During the third cycle all the scissors bars 286D, 286M will be restored by bars 316D, 316M and pawls 282 relatched prior to sensing the second card from each hopper since magnets DSM, MSM have not been energized to prevent coupling their respective bars 316D, 316M to slide 308.

It will now be assumed that the second master card has an account number which is higher in value than the one in the second detail card and that the disagreement occurs only in the units column, the master card having a "5" hole and the detail card a "4" hole in column 6. The operation of the machine during the third cycle will be the same as described above except that scissors bar 286D will be stopped at the "4" position while the bar 286M, as before, will stop in the "5" position.

This setting of bars 286M, 286D causes the units switch lever to rock counterclockwise to engage one of its switch blocks with the right hand strip as shown in Fig. 17. Since all the other active switch levers assume central positions due to the fact that the holes in columns 1 to 5 agree in value, the magnets MSM, MFM, MS will be energized in parallel when contacts CC6, CC7 close near the end of the third cycle. Magnets in parallel with DSM will not be energized since none of the switch blocks 302 engage the left hand contact strip 305. The circuit for magnets MSM, MFM and so on, extends from wire W3; contacts CC6, CC7, DCL, and MCL; contact strip 305, right hand units switch block 302; the remaining switch blocks 302 and all the inserts 301 on the master card side of the switching mechanism; and magnets MSM, MFM, MS in parallel, to line wire W4.

The master feed magnet MFM (Fig. 5) attracts its armature 145 moving latch block 145b into the path of lug 103b and preventing spring 102 from rocking bell cranks 99 to feed a master card. Magnet MS (Figs. 3 and 7) releases latch 241 just before link 236M starts to move to the right under control of cam 235 thereby preventing the master card stops 171, 203 from moving out of the path of the second master card just sensed by brushes MB and the third master card in the card registering mechanism.

The energization of magnet MSM prevents pawl 322 on the master side of the analyzer from coupling bar 316M to slide 308 thereby preventing restoring of bars 286M and their setting is not disturbed.

Thus, the feeding of master cards is stopped and the one which effected the setting of bars 286M is prevented from passing to the matching pocket. Since the magnets DSM, DS, DFM remain deenergized, the second detail card will be fed into the matching pocket MP during the fourth cycle.

A third detail card will now be sensed by brushes DB while the second master card is being held by stop 203 and bars 286D will take new settings under control of the third detail card while the setting of bars 286M will be unchanged. If the third detail card is also designated with a lower number than the one represented by the setting of bars 286M, the switch lever corresponding to the highest denominational order in which the detail card is lower in value than the master card will dominate the others for lower orders and again cause magnets MSM, MS, MFM to be energized to retain the master card in course of feed and prevent resetting the bars 286M as before, and the third detail card will pass into the matching pocket.

As an illustration suppose the cards were designated as below and were fed from the respective hoppers in the numerical order shown:

Master cards

| Card No. | Account No. |
| --- | --- |
| 1 | 446625 |
| 2 | 446635 |
| 3 | 546250 |

Detail cards

| Card No. | Account No. |
| --- | --- |
| 1 | 446625 |
| 2 | 446634 |
| 3 | 446635 |
| 4 | 456250 |

During the second machine cycle, the No. 1 cards would be compared as to account number and both permitted to pass to the feed rolls 194, 195 as neither card stop 203 would be held in the paths of the No. 1 cards and they will partly enter such feed rolls.

The No. 2 cards will be compared during the third cycle; No. 1 detail card will be fed into the match pocket, No. 1 master card advanced to feed rolls 216, 217; No. 2 master card will be held by the card stop 203, and the No. 2 detail card will enter feed rolls 194, 195. Bars 286M will retain the setting "446635."

During the fourth cycle, the No. 1 master card will be fed into the matching pocket ahead of the No. 2 detail card since rolls 194, 195 on the detail side are slower than feed rolls 216, 217. Also the No. 3 detail card will be compared with the No. 2 master and, since they agree, both will be delivered to the feed rolls 194, 195 and the bars 286M, 286D will be reset deenergizing magnets MSM, MS, MFM.

The No. 3 master card and the No. 4 detail card will be compared during the fifth cycle; the No. 3 detail card will pass into the matching pocket, and the No. 2 master card will enter rolls 194, 195. The bars 286 D, 286M will take the settings "456250" and "546250" respectively, and, since the account number of detail card No. 4 is lower than master card No. 3 in the 100,000's order, the corresponding switch, which is the sixth from the top in Fig. 16, will take the position there shown. However, in the 10,000's order the account number of detail card No. 4 is higher in value and the corresponding switch will take the position shown in Fig. 16.

It will be observed in Fig. 16, that under the above conditions, the sixth switch from the top completes a circuit from the right hand contact strip 305 to magnet MSM and cancels the effect of the fifth switch from the top by breaking the circuit to the left hand switch block 302 of the fifth switch.

It will be seen that the account number of the No. 4 detail card could be higher or lower in value than the No. 3 master card in any of the lowest five denominational orders without affecting the result in any way.

XVIII. Matching Single Detail With Single Master Cards

This operation is in most respects similar to the one just described, so far as the comparison of the account numbers on the cards and their relation to each other is concerned. However, there may be present detail cards for which there is no master card and vice versa. The master cards may be higher, or lower, or identical with respect to the detail cards.

The master cards and detail cards are preliminarily sorted into serial number and placed in the hoppers as described in section XVI. The machine is plugged in the same general fashion and the same assumptions in respect to the disposition of the account number will be made in the present section. Lever 256 is set to "match" position, thereby conditioning the reject pocket deflector mechanism for selective control by magnet CRM so that energization of this magnet will cause master cards to be guided into the reject pocket RP. The single card match switch S1 (Fig. 16) is closed.

The machine is started as described in section XVI and will operate in exactly the same way as long as the account numbers on both master and detail cards agree. Each master card will drop on top of its corresponding detail card. Magnet CRM will not be energized hence the master cards which agree with detail cards will not be deflected to the reject pocket RP as the armature 254 (Fig. 7) of this magnet locks the deflector elements 207 in the position opposite to that shown in Fig. 4.

As there may be present master cards for which there are no corresponding detail cards in the machine, eventually a master card will be sensed by brushes MB which bears a lower account number than the detail card which is sensed at the same time as the master card. Assume that the master card bears account No. 446634 while the detail card bears the number 446635. The master card No. 446635 corresponding to the latter detail card will follow the master card No. 446634, and it is desirable to reject this last card and thereafter send the master card 446635 to the match pocket to fall on top of detail card 446635.

As the master card 446634 and detail card 446635 pass the brushes MB, DB, respectively, the bars 286M, 286D will be set in accordance with the account numbers. Since the detail card is higher in value than the master card in column 6 (the units order) the topmost switch Fig. 16 will close a circuit to the magnets in parallel with the magnet DSM, while all the other switches of the analyzer will assume the central position.

The energization of magnet CRM (Figs. 4 and 7) causes armature 254 to release arm 208 and the latter is caused to rock counterclockwise (Fig. 7) in response to the normal movement of link 236M to the right. The deflector elements 207 are thus moved to the position of Fig. 4 whereby the master card 446634 will be deflected into the reject pocket RP during the next cycle.

The energization of magnets DFM, DS, DSM stops the feeding of detail cards, prevents resetting the bars 286D, and stops the detail card 446635 at the entrance to the matching pocket. Since magnet MSM has not energized during this cycle, the bars 286M will be restored.

During the next cycle, the detail cards remain at rest, the master card 446635 is sensed and bars 286M set, and the master card 446634 will be carried into the reject pocket. Since the bars 286M now are set to the same values as bars 286D, none of the various magnets DFM, MFM, DSM, MSM, etc., will be energized, and, since the deflector operating arm 208 is restored to the latched position of Fig. 7 by the time bars 286M are all set, both cards numbered 446635 will be allowed to proceed to the matching pocket.

It has been assumed above that for each detail card there is a single master card. On this basis the master and detail cards will be either identically punched or some master cards may be lower in value than the detail cards with which the master cards are compared. It may happen that a card is erroneously punched or misplaced so that, when the comparison is made between a master and a detail card, the master card is higher in value than the detail card.

If no means were provided to prevent it, the occurrence of a master card higher in value than the detail card last sensed or sensed simultaneously would cause the feeding of master cards to stop and many, if not all of the detail cards would be fed into the matching pocket although some might belong with succeeding master cards. If, after a number of detail cards have been fed into the matching pocket, by accident there happened to be fed a detail card that corresponded to the high master card, the two cards would be deposited in the matching pocket. The next master card would be lower in value than the high master card and any subsequent detail card and the feeding of detail cards would be stopped. Since many subsequent master cards might be lower in value than the high master card, they would be fed into the reject pocket in consequence of the fact that the detail card, which is left in position when the feeding of detail cards stops, is higher than the master card next succeeding the high master card. Thus the machine might eventually stop without any more detail cards being fed. The length of time the detail card feeding mechanism is stopped will depend, of course, on the control number with which the high master card is punched. This is due to the fact that the low detail cards corresponding to the master cards following the high master card will have already been fed into the matching pocket before the agreement between the high master card and a detail card takes place.

The single card match relay SCM in series with switch S1 prevents the above difficulties. When an incorrectly punched or misplaced card causes the master card to be higher in value than the detail card last sensed or sensed simultaneously, relay SCM is energized along with magnets MSM, MFM, MS. This stops the driving motor DM, the setting of bars 286M is retained, the card stops function to hold the high master card at the entrance to the reject pocket, and contacts SCM1 of relay SCM open to break the holding circuit for relays A and B.

The stopping of motor DM gives the operator an opportunity to remove the high master card and the detail card from their position at the entrance to the reject and matching pockets for the purpose of ascertaining the reason for the incorrect comparison.

This is easily done by removing the cards from the hoppers and holding one of the start keys in depressed condition until all the cards in course of feed have entered the pockets. The topmost cards in the pockets can then be removed and compared visually and steps taken to correct the errors discovered.

Relay contacts SCM1 have no effect on relays C and D since contacts DCLR, MCLR, MHC, FPC, and MHC remain closed when the machine stops. This is due to the fact that cards are present under the card levers and in the hoppers. Of course, the card lever and hopper contacts open when the cards in course of feed are removed as described above for purposes of inspection.

XIX. MATCHING GROUPS OF DETAIL CARDS WITH SINGLE MASTER CARDS

This operation consists in placing a single master card having a given account number in a group of related detail cards, all of which bear the same account number as the master card. The cards are preliminarily sorted and the machine is set as described in section XVIII except that switch S1 is opened to render relay SCM ineffective. It will be assumed that the first five cards correspond as to account number with the first master card.

The first master and first detail card will agree in respect to the account number when they are sensed together by brushes DB, MB. Thus all of the analyzer switch devices will assume a central position and none of the control magnets MSM, DSM, etc., will be energized. The first detail card will be carried into the matching pocket MP during the next cycle but the master card will only be carried to the entrance to this pocket. While the first master card is being carried to the entrance to the matching pocket, and the first detail card is entering such pocket, the second master card and second detail card are compared as to account number. Obviously, the second master card will have a higher account number, causing magnets MSM, MFM, MS to be energized and stops the feeding of master cards including the first master card which will be held by stop 228 (Fig. 4) at the entrance to the matching pocket. During the next three cycles, the account numbers of the last three detail cards will be compared with the account number of the special master card as represented by the setting of bars 286M. Obviously, the account number on all these detail cards will be lower in value than the account number of the special master card and all these detail cards will be treated like the first two and will be deposited in the matching pocket. The magnets MSM, MFM, MS will be energized during the sensing cycles of the last four cards of the group of five detail cards and the first and second master cards will remain stationary.

The sixth detail card may be higher, identical, or lower as to account number than the second master card. These three conditions will be discussed separately.

In case the sixth detail card is higher, the analyzer switching devices will cause energization of magnets DSM, DFM, DS, and CRM thereby stopping the feeding of detail cards and causing the first master card to be fed into the matching pocket on top of the fifth detail while the second master card will be fed eventually into the reject pocket. The third master card will then be sensed while the sixth card is held stationary at the entrance to the matching pocket and the account number of the sixth detail compared with that of the third master card.

If the sixth detail card has the same account number as the second or a subsequent master card, both the sixth detail and second master will be treated like the first card of each kind.

On the other hand, if the sixth detail card is lower than the second master card, magnets MSM, MFM, MS will be energized causing the first and second master cards to be held while the sixth detail card is being fed into the matching pocket and the seventh detail card is being compared with the second master card. As the seventh card might also be lower than the second master card, the first master card would eventually fall on top of a detail card having a higher account number. Obviously, this is not desirable, consequently it is essential to the proper working of the machine in matching single master cards with multiple detail cards, to ensure beforehand that there are no detail cards present for which there is no master card present.

XX. Separation Master Cards from Detail Cards

In performing this operation the analyzer and detail card side of the machine are not used. The unmatch switch US is placed in dotted line position (Fig. 16), hopper switch HS is closed to shunt detail hopper contacts DHC and the detail card lever contacts DCLR, the lever 256 is set at "Interleave," and magnets DM, MM are not plugged.

There are several ways in which the master cards may be distinguished from detail cards. One of the most common methods is to cut one of the corners of the master cards while some corners of the detail cards are uncut. Thus detail cards may have the upper left hand corner cut while the master is cut in the upper right hand corner, or holes are punched in the "11" or "12" positions of a given column of the master card while the detail cards are not so punched. The brushes LMB, RMB sense the left and right hand edges of the cards adjacent the first and last columns of the master card. If the upper right hand corner of the master card is cut, the plug socket RMPS is plugged to the unmatch plug socket UPS, the batch of mixed master and detail cards is placed in hopper MH face down with the "9" positions at the left (Fig. 1) and the machine is started as described in section XVII.

Detail cards not having their upper right hand corners cut, will insulate brush RMB at the "12" position in the cycle when contacts CC1 are closed (Fig. 22) and no circuit can be established through magnet CRM. Thus all detail cards will be conveyed to the pocket MP.

Master cards, having a cut corner, will cause magnet CRM to be energized at the "12" position over a circuit as follows: Wire W3, contacts CC1, brush 184, master contact roll MCR, brush RMB, plug wire, and magnet CRM, to wire W4. Energization of magnet CRM causes the master cards to be diverted to the reject pocket.

When master cards are distinguished from detail cards by a hole in a given column, the plug socket UPS is plugged to the proper plug socket MPS and the punched cards will be diverted to the reject pocket while the unpunched cards will be conveyed to the matching pocket.

Obviously, the detail cards could have a hole in a given column which is unpunched in the master, or a cut corner where the master is uncut. This would cause detail cards to fall in the reject pocket and master cards in the matching pocket.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In combination with means to feed records bearing data designations disposed in columns and means to sense said designations and record; and record registration mechanism comprising a pair of rods mounted in spaced relation for longitudinal movement transversely of the feeding movement of the records, a plurality of flat record support plates mounted in spaced relation on said rods, said rods extending through holes in the plates, a side guide mounted on said rods and projecting crosswise of one edge of a record and extending parallel to the record columns and to the line of feed of the records, said side guide being engageable with the edge of the card; a second side guide located opposite the first guide and mounted independently of said rods so as to be relatively fixed, said second side guide projecting transversely of the edge of the record opposite the first mentioned edge of the record, both said side guides cooperating with opposite edges of a record to guide the latter in its feeding movement, and means to actuate the assembly comprising the rods, the support plates and the first named side guide as a unit whereby to move the card supported by said plates against the record side guide to aline the record columns with the sensing means.

2. Analyzing means for comparing two sequential values in two different records, said values being represented in each record by a single designation placed in one of a plurality of index-point positions corresponding to a complete scale of sequential values such as the numerals 0 to 9, comprising a pair of magnets, each magnet corresponding to one of the columns and controlled by any single designation in said column, a pair of racks each corresponding to one of the columns and the magnet associated with said column, each rack being variably selectively movable to any one of a plurality of positions, each position corresponding to one of the index-point positions in a record column, means controlled by each magnet for moving its rack to any one of said series of positions according to the sequential value of the single designation in the corresponding column whereby said rack by its position may represent any one of a complete sequence such as a series of numerals, and means responsive to the movements of both racks for controlling the operation of the machine in accordance with the sequential relationships between the single designation in one of the record columns and the single designation in the other record column of a pair, said means including a member differentially settable under control of said pair of racks to one of three positions to indicate whether a given designation is higher, lower or equal in sequential value than the other.

3. In a record controlled machine, analysing mechanism comprising a series of sections, each section consisting of a pair of racks, each pair of racks being associated with two corresponding columns of two records to be compared, in each of which columns sequential values are recorded by means of a single designation disposed in any one of a series of index-point positions corresponding to a complete sequence such as a scale of numbers, each rack being movable to any one of a series of positions each of which corresponds to one of said index-point positions; each section including means responsive to the two designations in two corresponding columns of the two records to move the racks of each pair longitudinally and relative to each other extents proportional to the sequential values of the designations of said columns and including means jointly mechanically actuated by said racks and variably selectively settable thereby in accordance with the numerical relationship between a single designation in one record column to a single designation in the other, said last named means being set by the relative movement of the racks to one of three positions according to whether one designation of a pair is higher, lower or equal to the other designation of the pair; and means for controlling the operation of the machine in accordance with the settings of the last named means.

4. In a record controlled machine, means to sense data designations disposed in the columns of two separate record fields, each designation representing a single digit by the location of the designation in any one of a series of index-point positions in a single column, said index-point positions corresponding to a complete scale of numbers such as the numerals 0 to 9, inclusive; two series of racks, each series associated with one of said fields, each rack being associated with one of said columns in the field, means controlled by each designation for variably selectively moving each rack to any one of a plurality of positions corresponding to the series of index-point positions in a column whereby each rack by its position may represent any one of said complete series of values, means including a series of elements, one for each pair of racks and jointly actuated by the associated pair of racks according to the amounts of displacements thereof and movable by said racks to any one of three positions denoting whether designation in one record column is higher, lower or equal to a designation in another column, and machine control means selectively controlled by the positions of the last named elements.

5. In a record controlled machine, means to sense data designations disposed in the columns of two fields to be compared, each column containing a single data designation which by its position in one of a series of index-point positions in said column represents any one of a complete scale of values or sequential positions such as the numerals 0 to 9, inclusive; two series of racks each series being associated with one of said fields and each rack corresponding to one of said columns and movable to one of a series of positions corresponding to said scale of values, means controlled by the single designation in each column of each field for variably moving the corresponding rack an extent proportional to the value of said designation, a plurality of machine control means, and means jointly controlled by the displacements of both series of racks for selecting one of the machine control means, said last named means including members actuated by the movements of said racks to one of three positions according to whether a designation in one column is numerically higher, lower or equal to a designation in the corresponding column of the other field.

6. In a record controlled machine, means to sense data designations disposed in the columns of two separate records; two series of variably settable members, each series associated with one of said records; means controlled by the sensing means for variably setting the settable members of each series in accordance with the designations in the associated field, two machine control devices each controlling the disposition of one of the two records, means responsive to the settings of both series of members for selecting one or the other of said devices according to the relation the designations in one field bear to the designations in the other field, two resetting means one for each series of members, and means controlled by the member responsive means for selecting one of the resetting means for operation.

7. Analyzing mechanism for record controlled machines comprising a pair of racks longitudinally movable relative to each other and having two opposed cam surfaces arranged scissors fashion, means to differentially set each rack in accordance with a designation in a controlling record, a sensing element cooperating with both cam surfaces and slidably and pivotally mounted so as to be capable of assuming any one of several positions according to the relative displacements of the racks in accordance with designations, and machine control means variably set by said sensing element in accordance with the control over said element exerted by said racks.

8. Analyzing mechanism for record controlled machines comprising a pair of cam members having opposed cams arranged scissors fashion and adapted to be moved relative to each other, a member engaging both cams so as to be variably responsive to relative movement of said cams, means controlled by and responsive to a designation in a controlling record for positioning each of said cam members according to the values of said designations, and means to control machine operations in accordance with the position of the cam engaging member.

9. In a record controlled machine, two sets of record sensing, and feeding mechanisms, said sensing mechanism being arranged to sense designations in two different records, analyzing mechanism having two sections each associated with one of the records and arranged to compare said designations under control of the sensing mechanisms and having means to reset each section independently of the other; means controlled by said analyzing mechanism for selectively controlling both the feeding mechanism and the resetting means.

10. Analyzing mechanism for a machine of the class described, comprising a series of pairs of members, each member of a pair being differentially selectively settable relative to the other member in proportion to the value of a single designation in a single column in one of two records to be compared, said designations being placed in any one of a plurality of index-point positions in said column corresponding to a complete series of sequential values such as the numerals 0 to 9 inclusive, a series of elements for sensing the extents of the selective movements of the pairs of members, each of said elements being operated by a pair of said members and disengageable therefrom, and manually operable means for disengaging the sensing elements from the coacting pairs of members seriatim whereby to manually variably preselect the number of said elements to be used for comparing purposes.

11. Analysing mechanism for record controlled machines, comprising a series of pairs of racks each rack being movable relative to the other to an extent corresponding to the relative values of two designations to be compared, means controlled by said designations for variably setting each of the racks according to the value of a designation, a series of sensing members each engaged by both racks of a pair and variably settable thereby in accordance with the relative movement of said racks, and manually operable means to withdraw a predetermined number of said members from engagement with the racks to predetermine the number of sensing members used.

12. Analyzing mechanism for record controlled machines comprising a series of pairs of cam members, each member of a pair movable relative to the other, each pair being associated with a pair of record columns to be compared; means controlled by designations in each pair of columns for differentially setting the members of the pair associated with said columns extents determined by the values of the designations; a series of cam followers each engageable with a pair of cam members and variably set in accordance with relative movement of the cam members, means to withdraw the cam followers from engagement with the cam members, and means to actuate the withdrawing means in a predetermined order.

13. Analysing mechanism for record controlled machines comprising a series of pairs of racks, each rack of a pair being movable relative to the other, each pair being asociated with a pair of columns to be compared; means controlled by a designation according to its position in one of said columns for variably positioning the corresponding rack an extent proportional to the value of the designation whereby said racks are positioned according to the digits of numbers designated in the records, and a series of control devices each including an element associated with a pair of racks and movable by both racks of a pair to any one of three positions according to whether the value denoted by the position of one rack is higher, lower or equal to the value denoted by the position of the associated rack, said pairs of racks and their control device being arranged in a denominational order sequence whereby an inequality of one kind in a higher denomination predominates over an inequality of the other kind in a lower denomination, and machine control means selectively controlled in accordance with the predominating device.

14. In a machine of the class described, two record supply hoppers; two sets of card feeding and sensing mechanisms, each set associated with one of said hoppers; a pair of record receptacles each associated with a hopper, means to deflect a record fed from one hopper into the receptacle associated with the other; analyzing mechanism controlled by the record sensing mechanism for comparing data designations in a record feed from one hopper with designations in a record fed from the other hopper, said analyzing mechanism including two sets of members each movable to a plurality of positions each of which positions corresponds to the value of a designation, means controlled by designations for setting said members according to the values of the designations whereby each member may be positioned according to a complete scale of values, and including means controlled by both of said members for indicating whether one record is higher, lower or equal to the other in respect to the values of the designations; and means controlled by the last named means for operating the deflecting means whereby both of the records having designations of equal value are caused to be deflected to a predetermined receptacle, and records having a predetermined type of inequality are deflected to the other receptacle.

15. In a record controlled machine, two record supply hoppers, two receptacles associated therewith, means to feed the records from each hopper to its corresponding receptacle, means to deflect a record in course of feed from a predetermined hopper to the corresponding receptacle to the other receptacle, a pair of record sensing devices each associated with one of said hoppers for sensing successively records fed from the associated hopper, each sensing device including a series of electrical sensing elements each associated with a record column in which numerical values are designated by means of a single designation differentially disposed in any one of a plurality of index-point positions representing a complete range of sequential values such as the numerals 0 to 9; a record analysing mechanism arranged in denominational sections, each section including a pair of magnets, each magnet being controlled by one of the electrical sensing elements associated with two corresponding columns in two records to be compared, a pair of differentially selectively movable members each associated with a magnet and settable under control of the magnet to a position corresponding to the sequential value of a designation in a column sensed by the electrical sensing device associated with said magnet, each section also including an element settable under control of both members of said section to one of three positions designating the sequential relationship between the values designated in one of two compared columns corresponding to a section and the value in the other column; and means conjointly controlled by all of said elements for operating said deflecting means according to the numerical relationship between all the designations in one record and all the designations in the other record whereby records equally designated are disposed in one of said receptacles and records which disagree are disposed in the receptacles corresponding to the hoppers from which said records are fed.

16. In a record controlled machine means to compare the records in respect to data designations therein, each value being represented by a single designation disposed in one of a series of index-point positions representing a complete scale of sequential positions such as numbers, said comparing means including two series of members each series corresponding to one of said records, the members of each series being paired with the members of the other series, each pair being associated with a pair of corresponding columns in the respective records, and differentially selectively settable to correspond with the sequential values of the designations in said records whereby each member of a pair by its extent of movement represents the sequential value of the designation in one of the corresponding columns, elements movable to three positions to indicate two kinds of inequality and an equality relationship, each element being associated with and controlled by one of said pairs of members, the setting of said pairs of members in accordance with the values of the designations in the corresponding pair of columns positioning the associated element according to the sequential relationship between the designations; a pair of record receiving receptacles; means to determine the receptacle receiving records, said determining means being settable to one position to cause a record from one hopper to enter one receptacle and a record from the other hopper to enter the remaining receptacle or to cause one of said records to enter the receptacle receiving the other record; and means jointly controlled by said elements for positioning the determining means in accordance with the sequential relationship of all the designations in one record to all the designations in the other record.

17. In a machine of the class described, two record supply hoppers; two sets of card feeding and sensing mechanisms, each associated with one of said hoppers; a pair of record receptacles, each associated with a hopper; means to deflect a record fed from one hopper into the receptacle associated with the other, analyzing mechanism for comparing data designations in a record fed from one hopper with designations in a record fed from the other hopper, means controlled by the analyzing mechanism for operating the deflecting means whereby two records having designations of equal value are deposited in a predetermined receptacle and records having a predetermined type of inequality are deposited in the receptacle associated with the hoppers from which said records were fed, and means controlled by the analyzing mechanism for stopping the machine when a different type of inequality occurs.

18. In a machine of the class described, a pair of relatively movable toothed members, a pair of magnets for controlling the toothed members, pawls controlled by said magnets and operable to stop the respective members in various positions according to a scale of sequential values, means to move said members in unison for control by the pawls, means cooperating with both of said members so as to be responsive to the relative movements of the members, said second named means being set by said members to one of three positions according to whether the setting of one member is higher, lower, or equal to the setting of the other member in respect to sequential value, and machine control means operated by the second named means.

19. In a machine of the class described, analysing mechanism comprising a pair of relatively movable members mounted in juxtaposition, means to move each member differentially variably selectively to represent any one of a complete series of sequential values such as the values 0 to 9, inclusive, whereby each member by its position represents any one of said values, each of said members being formed with a cam which confronts the cam of the other member; a cam follower cooperating with both of said cams and moved by the joint movements of both of said members to one of three positions to indicate whether the sequential value represented by the setting of one of said members is higher, equal to or lower than the value represented by the other of said members, and a three position switch operated by the cam follower.

20. In a machine of the class described, means to sense data designations in corresponding columns of two separate record fields, sequential values being represented by a single designation disposed in one of a series of index-point positions representing a complete series of sequential values such as the values 0 to 9, inclusive, in a single column; a pair of selectively movable members mounted in juxtaposition each member corresponding to one of said columns, means controlled by the sensing means for moving each of said members in proportion to the sequential value of the designation in the corresponding column, an element common to both of said members and actuated thereby to one of three positions denoting an equality relationship and two kinds of inequality relationships between the sequential values represented by the positions of said members, and machine control means controlled by the portion of the last named means.

21. In a machine of the class described, a pair of selectively movable members each of said members being settable to any one of a series of positions, each position representing one of a complete scale of sequential values, means to move all of said members in one direction throughout the entire range of values, means to variably stop said members during such movement according to the sequential values of designations in corresponding columns of two separate records, a plurality of machine control elements, and a device actuated directly by both of said members for selecting one of the last control elements according to the sequential relationship between the designations 22. Analysing mechanism for record-controlled machines, comprising a plurality of sections, each for comparing a designation in a column of one record with a designation in a column of another record, each section consisting of a single pair of members each associated with one column of the pair to be compared, means controlled by a designation in each column for variably selectively positioning the associated member to represent any one of a complete series of values according to the value of the designation, and means jointly actuated by the positioning movement of said single pair of members for indicating the numerical relationship between the designations of the pair.

23. In a machine of the class described, means to sense together data designations in a pair of corresponding columns of two records which are to be compared, data being represented in said records by a single designation differentially disposed in one of a series of index-point positions representing a complete scale of values in a number system, a single pair of movable members for each pair of columns to be compared, each member being movable relative to the other and each settable to any one of a series of positions corresponding to all of the index-point positions in one of said pair of columns, means controlled by the sensing means for setting each member differentially to one of said positions to correspond with the value designated by the perforation in the associated column of the record, and means engaging both of said members and actuated thereby to any one of a plurality of positions for indicating whether the designations in said pair of columns are equal or unequal and, when unequal, which of the designations is higher in value than the other, and machine control devices selectively controlled by said member.

24. In a machine of the class described, analysing mechanism comprising two series of members, one member from each series corresponding to a member of the other series, means to impart to said members a continuous movement in one direction, means to variably arrest said members in their movement whereby each member by its successively set positions designates any one of a complete series of values such as a number system employing the numerals 0 to 9, inclusive; and common means directly operated by the corresponding members for manifesting the sequential relationships between the corresponding denominations of the columns represented by the settings of said members, electrical switching means operated by the last named means and a plurality of machine control circuits connected to said electrical switching means, said circuits being selectively rendered effective according to which of the two compared values is higher, lower or equal in sequence to the other.

25. A comparing mechanism for machines of the class described comprising a pair of relatively movable members, means to cause a continuous motion of both of said members, means associated with each member for arresting the movement of said member in any one of a complete series of positions representing a complete scale of sequential values such as a numerical system employing the numbers 0 to 9 inclusive, means to operate the arresting means at different times in the movement of the associated relatively movable members whereby each of said members may be arrested in a position to designate any one of the complete series of values, and means selectively operated by both of the relatively movable members for designating the sequential relationship between the settings of the relatively movable members.

26. In a machine of the class described, analyzing mechanism comprising two series of settable members arranged in pairs, each member of one series being paired with a member of the other series for the purpose of comparing sequential values such as the digits in the corresponding denominational orders of two numbers comprising a plurality of digits each said members being differentially selectively settable to a plurality of positions corresponding to the digits of a complete scale of sequential values such as the digits of a number system; separate means for each member of a pair to set said member in accordance with one of two digits of a predetermined denominational order of the two numbers to be compared whereby to represent the sequential value of said digit by the position of said member; a series of coupling elements, each associated with and operated by both members of a pair, said coupling elements each taking one of three positions to denote whether one digit is higher, lower, or equal in sequence to the other of a pair to be compared; a switching device controlled by said series of coupling elements and comprising a series of contact elements one for each of said coupling elements, said contact elements being arranged to collectively control a plurality of circuits according to a plurality of sequential relationships between two compared numbers, said contact elements being so arranged as to denote which of two numbers comprising a plurality of digits is the greater sequentially; and machine control circuits selectively controlled by said switching device according to the sequential relationship between the two members.

27. In a machine of the class described, the combination of means to sense data designations on two separate records, a record comparing device including two series of differentially selectively settable members, each positionable in accordance with a designation on one of the records, means controlled by the sensing means for positioning the members of each series according to the numerical values of the designations whereby one series of members by their positions represent a multi-digit number; means for positioning said members including a plurality of magnets and circuits therefor controlled by the sensing means, and means controlled by the magnets for determining the position of the members; an electrical switching device comprising a series of movable switching elements each mechanically operated by a pair of said members and positioned thereby to denote which of two corresponding digits of two values compared is of a magnitude greater than the other, and a plurality of machine control circuits each including a series of contact elements cooperating with the switching elements to render said circuits effective and ineffective selectively according to the numerical relationship between two values compared.

28. A comparing mechanism for machines of the class described comprising two toothed racks which are movable relative to each other, each tooth on each rack representing one of a complete series of sequential values such as the numerals 0 to 9 inclusive, means to cause a reciprocatory movement of said racks, means associated with each rack and including a pawl engageable with the teeth of said rack to arrest the movement of the rack according to its position at a given instant of time whereby to stop the rack in a position to designate one of the series of numerals, and means operated by both racks and set thereby to designate the sequential relationship between the two values represented by the respective settings of the said racks.

29. A record comparing means for machines of the class described, comprising a pair of relatively movable members, means to cause a cyclic to and fro movement of said members, means associated with each member and operable during one of its strokes to arrest said member in any one of a series of positions representing a complete scale of sequential values such as the numerals 0 to 9, means to cause an operation of each arresting means in timed relationship to the movement of the associated member according to the value at which it is desired to arrest said member, and means cooperating with and operated by both of said relatively movable members for indicating whether the sequential value represented by the setting of one of said members is higher, lower or equal to the sequential value represented by the setting of the other of the relatively movable members.

30. A record comparing means for machines of the class described, comprising two longitudinally movable racks each having a series of abutments designating a complete scale of sequential values such as the numerals 0 to 9 in accordance with any one of which values each of said racks may be set, stop elements cooperating with the abutments on said racks, means to cause a continuous back and forth movement of both racks relative to said stop elements, and means operating in timed relationship to the movement of said racks for moving the stop elements into engagement with the racks to arrest the latter in positions representing each one of said complete scale of values, and an element operated by both of said racks and settable thereby to one of three positions indicating, respectively, that one of the values designated by the setting of a particular rack is higher, lower or equal to the sequential value designated by the setting of the other rack.

31. Comparing means for a machine of the class described, for comparing two numerical values which may be composed of a plurality of digits, comprising a single pair of movable members for each denominational order of the values to be compared, each of said members being formed with a cam; means to move each member of a pair to a position designating one of the digits in a given denominational order of the numbers to be compared whereby each pair of members by the positions thereof represent the digits in a predetermined denominational order of two numbers to be compared and a cam follower device cooperating with said cams so as to be moved by both members to positions dependent upon the numerical relationship of the digits compared; means controlled by all of the cam follower devices and so arranged as to denote which of two multi-digit numbers compared has the higher value if unequal, and machine control means selectively controlled by the last-named means according to which of two multi-digit numbers is higher than the other.

32. In a record-controlled machine, the combination of a pair of electrical sensing devices each for sensing data designations in one of a pair of records, said sensing device being operative to traverse a plurality of columns each of which may contain a single designation which by its position in said column represents a numerical value; two series of variably settable members arranged in pairs, each pair including a member from each of said series, the pairs of members being relatively movable; means associated with each member for arresting said member in any one of a plurality of positions representing a complete scale of values corresponding to the respective positions a designation may have in a record column and including a magnet connected to the part of the electrical sensing device associated with the predetermined column, said magnet being operative to cause its associated member to be arrested when the corresponding part of the electrical sensing device encounters a designation in the corresponding column; and means to move all of said members in step with the traversing of the pair of record cards by the electrical sensing means whereby the respective members are arrested in positions corresponding to the values of the designations in the respective column, and means operated by both series of members for designating the numerical relationship between the data in the columns traversed by one of the sensing devices and the data in the columns traversed by the other sensing device, said means including a series of elements each settable by a pair of members to designate whether the data in one record is higher, lower or equal to the data in the other record.

33. In a record controlled machine the combination of means to feed two separate batches of records each having a plurality of columns of index point positions representing a complete scale of sequential values such as the numerals 0 to 9, inclusive, in which columns the sequential values are designated by placing a single hole in any one of the index-point positions of a single column, two series of electrical sensing elements, each associated with one of the columns of the record and operative during the feeding of the records to traverse said column whereby the designations in said columns are encountered by said elements at different times according to the sequential values of the designations; two series of settable members, one member of each series being paired with a member of the other series and movable relative to the other member of said pair; means associated with each member for arresting the movement of said member, including a magnet in circuit with one of the sensing devices whereby the movement of each member may be controlled by the position of the designation in one of the record columns, each of a pair of members corresponding to a column in one record and a column in the other record, respectively; means to move all of said relatively movable members in proportion to the movement of the records whereby said members are arrested in various positions according to the positions of the designations in the records, an electrical switching mechanism jointly controlled by both series of members and settable thereby to manifest which of two records is higher in sequence than the other or to manifest equality of the data in said records and machine control circuits selectively controlled by said switching means.

34. In a machine of the class described, a pair of record receiving stations, means to feed two separate batches of records to a predetermined one of said stations, means to compare a record from one batch with a record from the other batch including means to indicate which of the records has designations higher in sequential value than the other, means controlled by the comparing means for selectively controlling the feeding means to cause the records from one batch to become interspersed with the records from the other batch in a predetermined sequence, and means controlled by the comparing means for stopping the feeding of records when the sequence of one of the batches is reversed.

35. In a record controlled machine, two series of variably movable members, one member of each series being paired with a member of the other series, means to periodically move all the members of each series a maximum extent corresponding to the end values of a complete scale of numbers such as the numbers 0 to 9, inclusive; means associated with each member for stopping said member in an intermediate position to represent an intermediate value whereby said members may be variably selectively arrested in any one of a plurality of intermediate positions corresponding to the intermediate values of said scale of numbers, a series of elements each corresponding to a pair of said members engaging and jointly operated thereby for indicating whether the value represented by the position of one member of each pair is higher, lower or equal to the value represented by the position of the other member of the pair, said elements being arranged to denote whether one multi-digit number is equal to, lower, or higher in value than another; and machine control means controlled by said series of elements according to the actual numerical relationship between data represented by the settings of one series of members and data represented by the settings of the other series of members.

36. A comparing mechanism for machines of the class described comprising a pair of relatively movable members, means to differentially variably set each of said members to represent any one of a complete scale of sequential values such as the numerals 0 to 9, inclusive, whereby each member by its position alone may denote any one of said sequential values, a lever jointly operated by both said members and set thereby to any one of three different positions to indicate whether the sequential value represented by the position of one of said members is higher, lower or equal to the sequential value represented by the position of the other said members, and a plurality of machine control elements for controlling different machine operations and selected by the position of said lever.

37. In a record-controlled machine, two series of members, each settable to any one of a whole range of sequential values, such as the numerals 0 to 9, inclusive, each of said members in one series being paired with and movable relative to a member of the other series, each of said members having a series of stop positions each of which positions corresponds to one of said range of sequential values, movable stop elements each corresponding to and cooperating with the series of stop positions on one of said members, means to move each member so as to cause the stop positions therein to successively move past the movable stop element associated with said member, and means associated with each movable stop element for operating the movable stops at different times according to the designated sequential values whereby to arrest said members in different positions designating sequential values, and means operated by both series of members for denoting the sequential relationship between prospective pairs of members.

38. In a record-controlled machine, means to feed two batches of records wherein data is designated by a single designation placed in any one of a series of index-point positions in each column of a field, each column containing index-point positions for a complete series of digits of a system of designating sequence such as the numerals 0 to 9, inclusive, of the decimal system; record comparing means comprising two series of movable members arranged in pairs, each pair consisting of one member from each series, whereby there is a single movable member for each column of each record, each series of members being associated with one of said fields; means controlled by the designation in each column for variably selectively setting the corresponding movable member in accordance with the position of said designation in said column whereby each pair of movable members is set to positions designating the sequential values of the designations in a pair of columns in said records, means associated with each pair of members and mechanically operated thereby to indicate whether the value represented by a designation in a given column is higher, lower or equal in sequence to the value represented by the designation in the corresponding column of the other record of a pair, and means jointly controlled by the positions of all of said elements for denoting whether the data on one record is higher, lower or equal in sequence to the data on the other record of a pair.

39. A record comparing mechanism for a machine of the class described, comprising two series of members, each member of each series corresponding to a digit of one of two multi-digit values to be compared, the members of one series being paired with members of the other series on a denominational order basis, means to cause a to-and-fro motion of all of said members, means to arrest said members in various positions according to the values of the digits in the various denominational orders of the numbers to be compared, a pair of machine controlling elements for controlling the to-and-fro motion of said series of members to cause said members to be active or inactive at will, means for sensing the relative positions of said series of members including a series of elements, each of which is jointly actuated by a pair of said members to one of three positions denoting whether the digits in a predetermined denominational order are equal or unequal and which of the digits is higher in value than the other, and means controlled by said series of elements for controlling the operation of the elements controlling the to-and-fro motion of said members.

40. In a machine of the class described; record comparing mechanism comprising two series of settable members, each series being associated with the denominational orders of one of two numbers to be compared, the members associated with corresponding denominational orders being paired, a series of elements each movable to one of three positions, each element being associated with a single pair of set members and directly actuated thereby to indicate whether a digit of a given denominational order in one of the numbers is higher, lower, or equal to the corresponding digit of the other number, said elements jointly manifesting which of the two numbers is greater if unequal; sorting mechanism including at least two record receiving receptacles, means to feed a plurality of batches of records to said receptacles, and means controlled by said series of elements for selectively controlling the operation of the sorting mechanism and the record feeding mechanism.

41. Apparatus for filing control cards, which cards have operating positions representing serial designations, certain of said positions being made operative to correspond with the designations of a record, and which cards are separated into two groups, the cards of one group being complemental in serial designations with respect to the cards in the other group, with the cards of each group arranged in serial order, said apparatus comprising a common receiver, means for withdrawing cards from each group, a pair of electrical sensing devices, each for sensing data designations in one of a pair of withdrawn cards, electrical circuit connections partially established under control of said sensing devices, means for completing said circuit connections, means for comparing operating positions of corresponding value in the withdrawn cards, said comparing means including said circuit connections and said means for completing said partially established circuit connections, and value differentiating selective means cooperating with said comparing means for ejecting into said common receiver the particular one of said compared cards having the lower designated value in a manner to form a single group in designation sequence.

42. Apparatus for filing control records which have designations representing the sequential position of each record in a series or order in which the records are to be filed, which records are separated into a plurality of groups, the records of each group being complemental in sequence designations with respect to the records in another group, the records in each group being arranged sequentially in the same sequential order as the final file; comprising a common receiver for the file, means for withdrawing records from each group, a plurality of sensing devices, each for sensing data designations in one of the withdrawn records, electrical circuit connections partially established under control of said sensing devices, means for completing said circuit connections, means for comparing operating positions of corresponding values in the withdrawn records, said comparing means including said circuit connections and said means for completing said partially established circuit connections; and value differentiating selective means cooperating with said comparing means for causing the ejection into said common receiver the particular one of said compared records which is next in order of filing according to said series or order whereby to arrange the records from said plurality of groups in a single file in said series or order in said common receiver.

EUGENE A. FORD.